(12) United States Patent
Minas et al.

(10) Patent No.: US 12,497,189 B2
(45) Date of Patent: Dec. 16, 2025

(54) FUEL TANK HEAT REJECTION SYSTEM

(71) Applicant: General Electric Company, Schenectady, NY (US)

(72) Inventors: Constantinos Minas, Slingerlands, NY (US); Brian Magann Rush, Niskayuna, NY (US); William Morton, Schenectady, NY (US)

(73) Assignee: General Electric Company, Evendale, OH (US)

( * ) Notice: Subject to any disclaimer, the term of this patent is extended or adjusted under 35 U.S.C. 154(b) by 303 days.

(21) Appl. No.: 18/062,848

(22) Filed: Dec. 7, 2022

(65) Prior Publication Data

US 2024/0190580 A1 Jun. 13, 2024

(51) Int. Cl.
| | |
|---|---|
| *B64D 37/34* | (2006.01) |
| *B64D 37/02* | (2006.01) |
| *B64D 37/06* | (2006.01) |
| *B64D 37/08* | (2006.01) |

(52) U.S. Cl.
CPC ............. *B64D 37/34* (2013.01); *B64D 37/02* (2013.01); *B64D 37/06* (2013.01); *B64D 37/08* (2013.01)

(58) Field of Classification Search
CPC ........ B64D 37/02; B64D 37/06; B64D 37/08; B64D 37/32; B64D 37/34
See application file for complete search history.

(56) References Cited

U.S. PATENT DOCUMENTS

| | | | |
|---|---|---|---|
| 2,262,606 A | 11/1941 | Hardman | |
| 2,309,813 A | 2/1943 | Whiting | |
| 3,158,197 A | 11/1964 | Blezard | |
| 3,420,477 A | 1/1969 | Howard | |
| 4,354,345 A * | 10/1982 | Dreisbach, Jr. | ......... F02C 7/224 60/39.08 |
| 6,343,465 B1 * | 2/2002 | Martinov | ................. A62C 3/08 60/39.83 |
| 9,302,778 B2 | 4/2016 | Ji | |
| 10,207,809 B2 | 2/2019 | Koerner et al. | |
| 10,399,692 B2 | 9/2019 | Soriano et al. | |
| 2015/0336680 A1 | 11/2015 | Schumacher et al. | |
| 2020/0115064 A1 | 4/2020 | Cordatos et al. | |
| 2022/0194622 A1 | 6/2022 | Rambo et al. | |
| 2022/0250761 A1 * | 8/2022 | Barmichev | ............ B64D 37/08 |

FOREIGN PATENT DOCUMENTS

| | | |
|---|---|---|
| EP | 3017165 B1 | 3/2019 |
| GB | 794125 A | 4/1958 |
| GB | 1426411 A | 2/1976 |
| GB | 2557302 A | 6/2018 |
| JP | 2005030371 A | 2/2005 |

* cited by examiner

*Primary Examiner* — Scott J Walthour
(74) *Attorney, Agent, or Firm* — Dority & Manning, P.A.

(57) ABSTRACT

A fuel tank heat rejection system for an aircraft. The fuel tank heat rejection system includes a fuel tank compartment in the aircraft and a fuel tank having an exterior surface and storing fuel therein. The fuel tank is located in the fuel tank compartment. The fuel tank heat rejection system includes one or more air valves that provide fluid communication to the fuel tank compartment. The one or more air valves opening to operably direct cooling air into the fuel tank compartment through the one or more air valves, the cooling air contacting the exterior surface of the fuel tank such that heat from the fuel is rejected from the fuel tank.

14 Claims, 12 Drawing Sheets

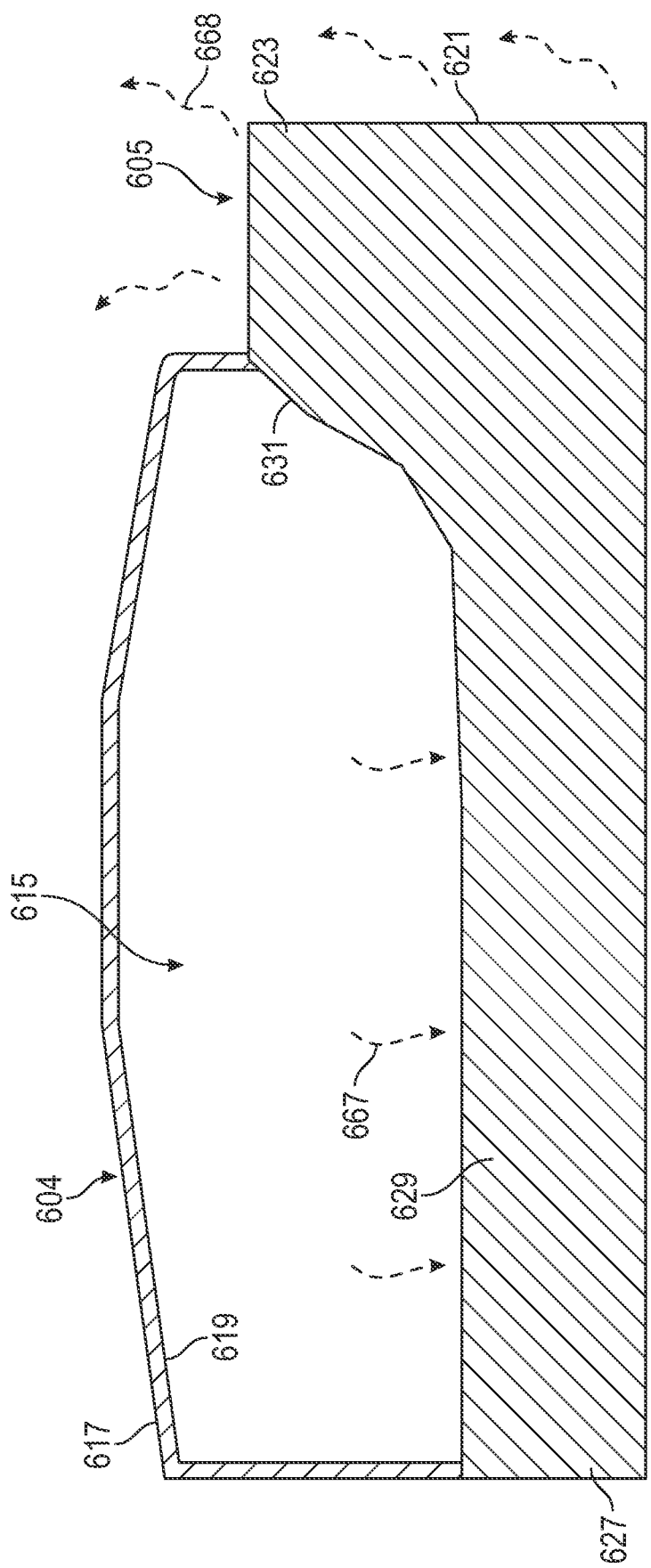

FUEL TANK HEAT REJECTION SYSTEM

TECHNICAL FIELD

The present disclosure relates generally to a fuel tank heat rejection system for vehicles, such as aircraft.

BACKGROUND

Vehicles, such as aircraft, typically include one or more fuel tanks for supplying fuel to engines, such as turbine engines, of the vehicle. The fuel in the one or more fuel tanks can absorb and can store heat.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 6B is a schematic cross-sectional diagram of the fuel tank having the one or more fins of FIG. 6A, taken at detail 6B-6B, according to the present disclosure.

DETAILED DESCRIPTION

Figure 1A:
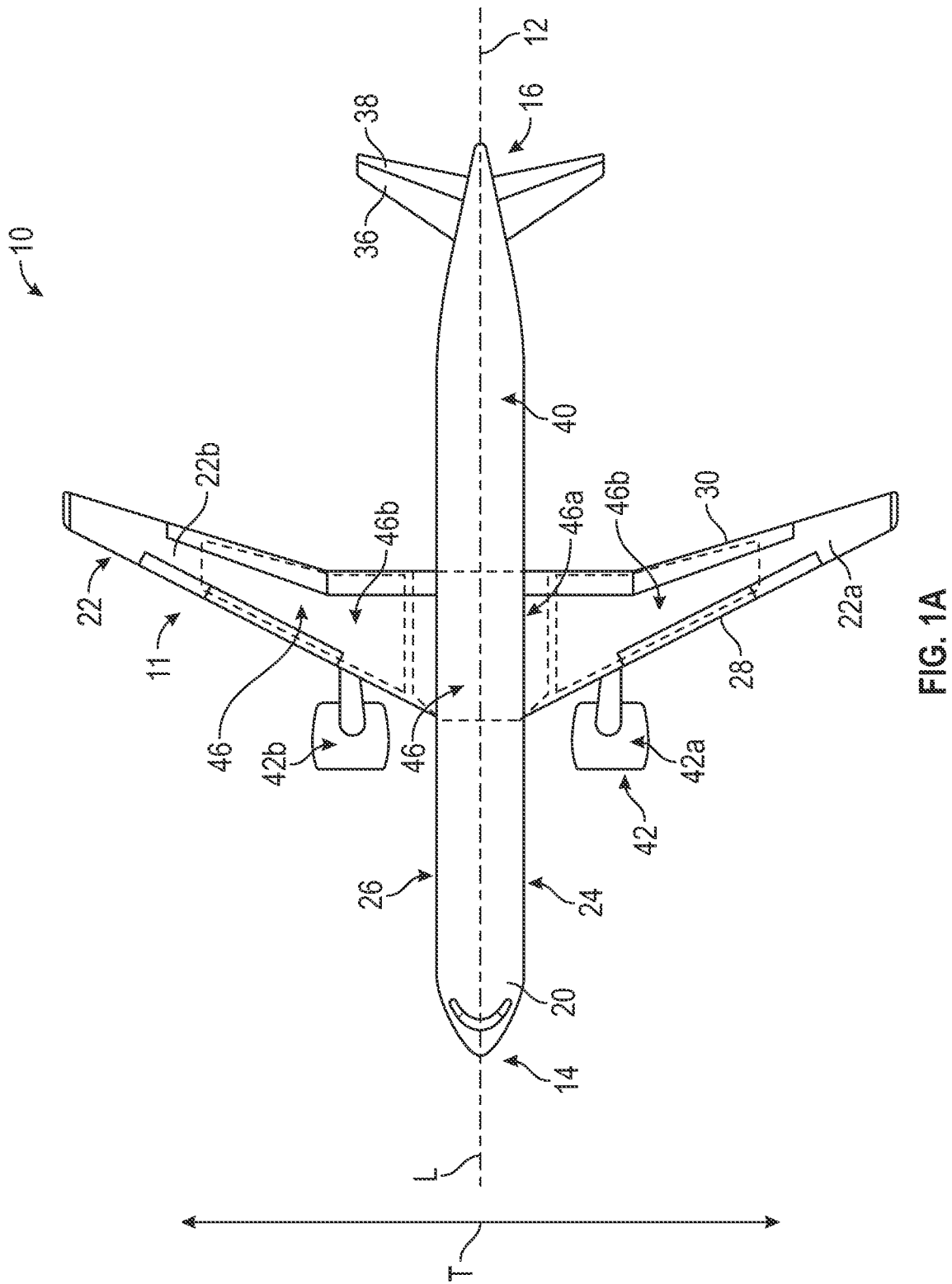
FIG. 1A is a top view of an aircraft having a fuel storage system, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low" and "high," or their respective comparative degrees (e.g., "lower" and "higher", where applicable), when used with compressor, turbine, shaft, fan, turbine engine components, or aircraft components, each refers to relative pressures, relative speeds, relative temperatures, and/or relative power outputs within an engine unless otherwise specified. For example, a "low temperature" refers to a temperature that is lower than a "high temperature." The terms "low," or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine or of the aircraft.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Figure 4:
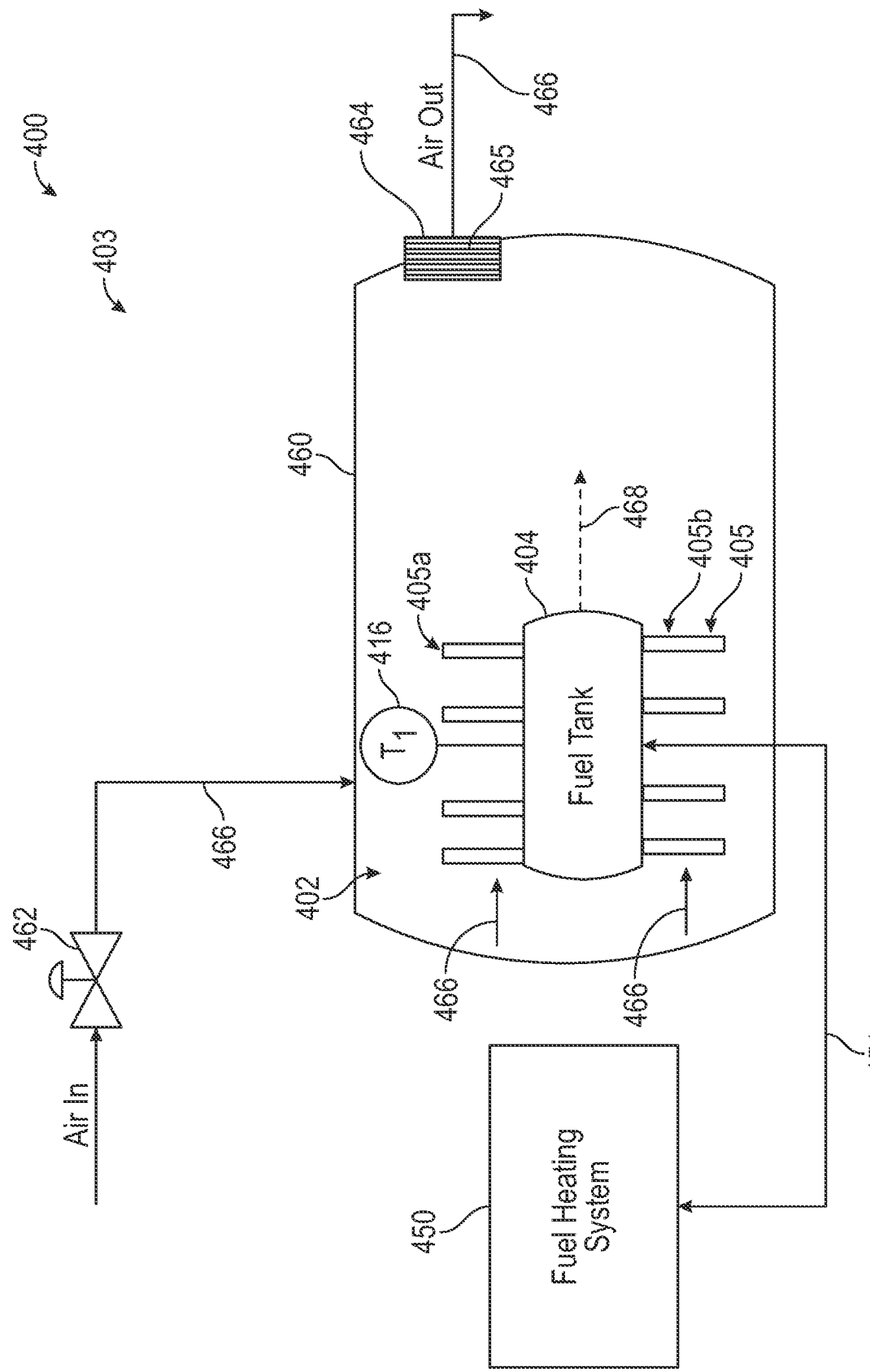
FIG. 4 is a schematic flow diagram of a fuel delivery system with a fuel tank heat rejection system for the aircraft of FIGS. 1A and 1B, according to the present disclosure.
Figure 6A:
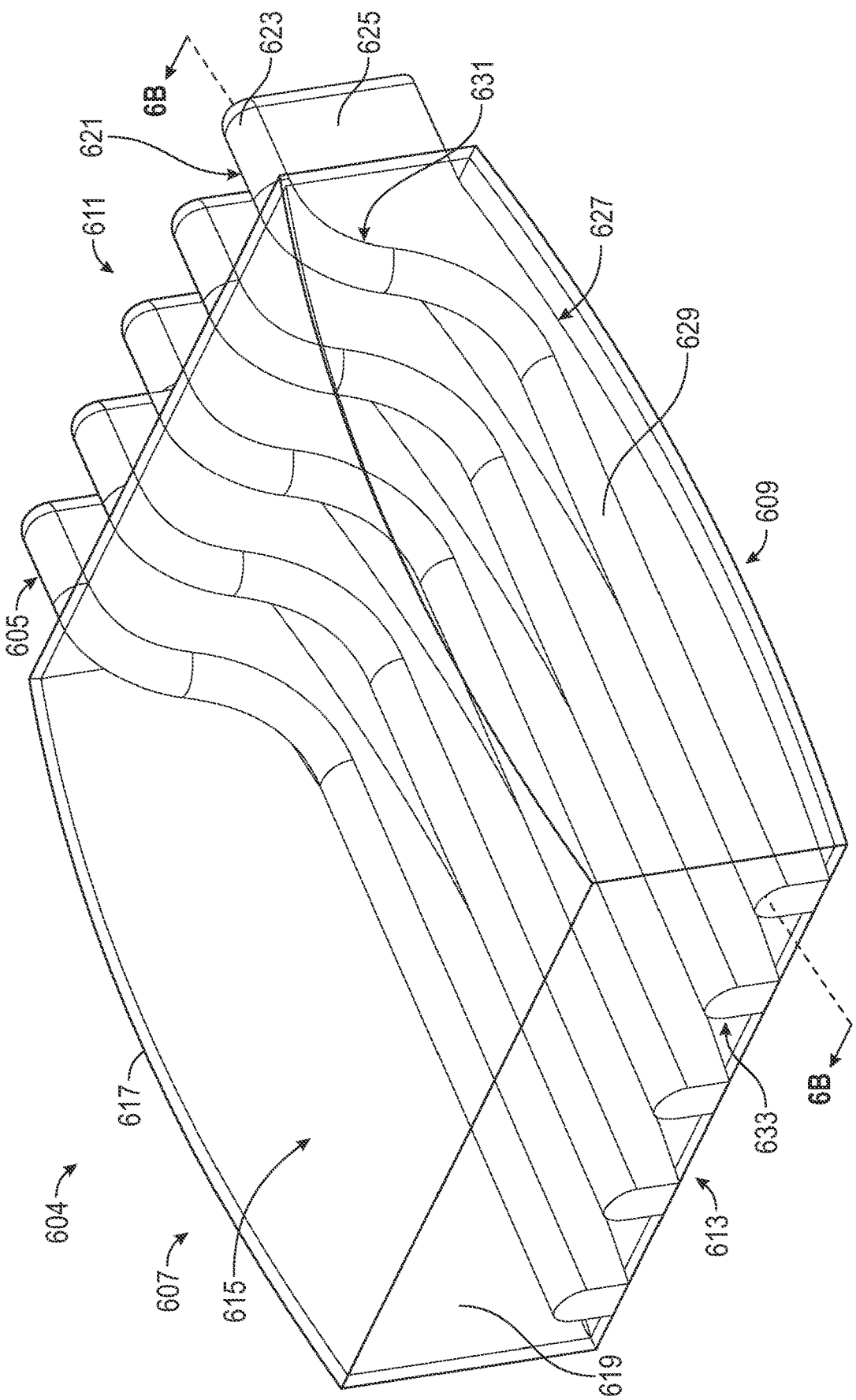
FIG. 6A is a transparent view of a fuel tank having one or more fins, according to the present disclosure.

As used herein, the terms "fins," "baffles," "ribs," or the like, refer to any type of surface extending from, or extending into, the fuel tank and having any shape or any size. For example, the one or more fins detailed herein can include a straight fin, a fin having a uniform cross section (as shown in FIGS. 4 and 6A), a fin having a non-uniform cross section, an annular fin that extends annularly about the fuel tank, a pin fin being substantially pin-shaped, or any other fin configuration, or combinations thereof.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Aircraft include one or more fuel tanks that store fuel and a fuel delivery system that delivers the fuel from the one or more fuel tanks to a combustion section of an engine of the aircraft. The aircraft can include a fuel heating system that heats the fuel that is stored in the fuel tank. In some embodiments, the fuel in the fuel tank can be used in a thermal management system of the aircraft or of the engines to cool components of the aircraft or of the engines. The fuel absorbs heat from the components, thereby cooling the components. The heated fuel returns to the one or more fuel tanks and is stored in the one or more fuel tanks. The heat in the fuel can be rejected to compartment air inside the aircraft. For example, during takeoff and climb, the fuel temperature increases, and, during cruise, the heat is rejected from the fuel. Such heat rejection, however, occurs at a low rate. In some instances, the fuel is heated faster than the heat is rejected from the fuel. In this way, the temperature of the fuel in the fuel tank can continue to rise. If the temperature of the fuel increases above a high temperature threshold (e.g., 300° F.), the fuel can begin to cook and carbonaceous deposits (also known as coke) form in the fuel, thereby reducing the propulsive efficiency of the engines. Accordingly, the present disclosure provides for a fuel tank heat rejection system for rejecting heat from the fuel tank.

The fuel tank heat rejection system includes a fuel tank having one or more fins, also referred to as baffles and/or ribs, to enable heat transfer from the fuel to the tank and from the tank to ambient air. The one or more fins increase a surface area of the fuel tank such that the one or more fins increase cooling of the fuel tank when air (e.g., ambient air) passes by and contacts the one or more fins. A control system monitors the temperature of the fuel in the fuel tank and maintains the temperature of the fuel in a predetermined range (e.g., about 40° F. to about 300° F.). If the temperature of the fuel increases above an upper limit (e.g., about 300° F.), the fuel heating system is turned off, and louvers in the aircraft open to allow ambient air outside the aircraft to enter the fuel tank compartment to cool the fuel tank and the fuel. If the temperature of the fuel decreases below a lower limit, the fuel heating system is activated to increase the temperature of the fuel and the fuel tank. The heated fuel can also be redistributed between a fuel tank in the fuselage and fuel tanks in the wings of the aircraft. The fuel heating system can turn on during a high cooling demand portion of the flight (e.g., takeoff and climb).

The fuel tank heat rejection system of the present disclosure allows the fuel and the fuel tank to be cooled, and ensures the fuel and the fuel tank are maintained in a predetermined temperature range. Thus, the present disclosure provides for a fuel tank with heat rejection capability. The present disclosure also provides for a control system that controls the fuel temperature in a predetermined range by enabling and regulating ambient air to enter the fuel tank compartment, disabling the fuel heating system, and redistributing the fuel between the first fuel tanks and the second fuel tanks. The present disclosure also allows a reduction in the components of the thermal management system of the aircraft, thereby reducing the size and the weight of the components of the thermal management system. For example, cooling the fuel and the fuel tank in such a way allows the fuel to store additional heat as compared to thermal management systems without the benefit of the present disclosure.

Figure 1B:
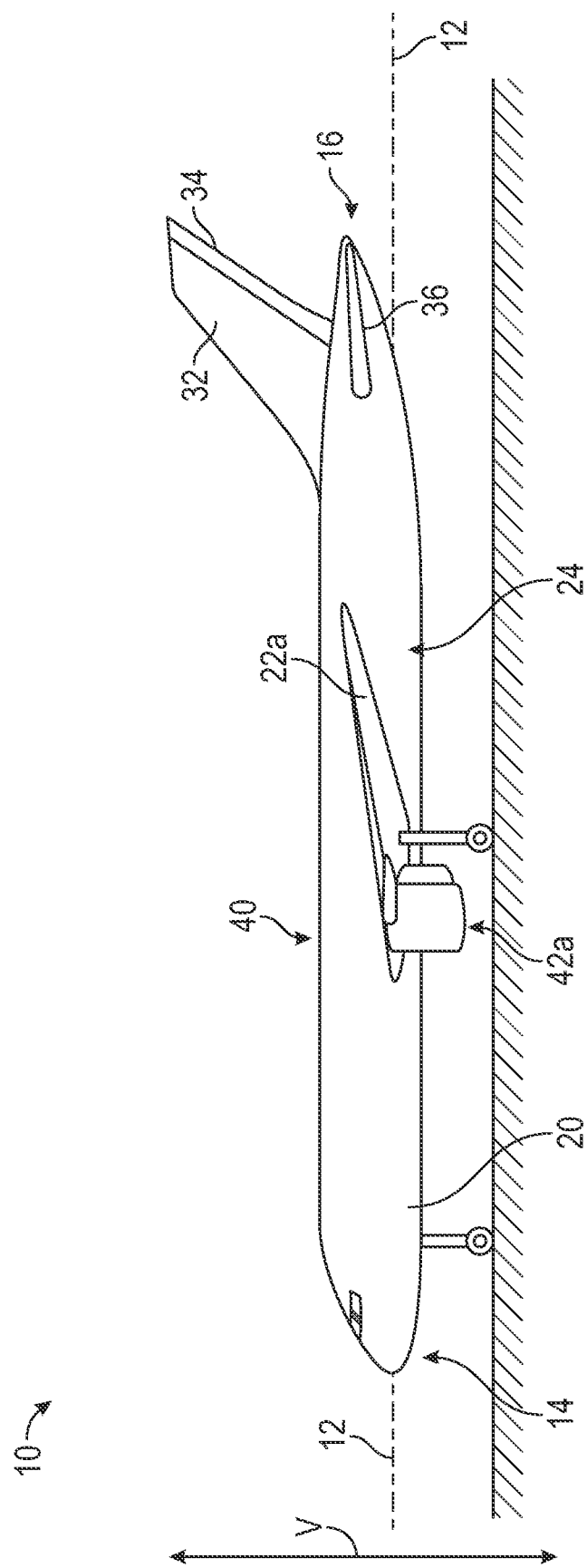
FIG. 1B is a port side elevational view of the aircraft of FIG. 1A, according to the present disclosure.

Referring now to the drawings, FIG. 1A is a top view of an aircraft 10 having a fuel storage system 11, according to the present disclosure. FIG. 1B is a port side 24 elevational view of the aircraft 10, according to the present disclosure. As shown in FIGS. 1A and 1B collectively, the aircraft 10 defines a longitudinal direction L that extends therethrough (extending parallel to a longitudinal, centerline axis 12 provided for reference), a vertical direction V, a transverse direction T, a forward end 14, and an aft end 16.

The aircraft 10 includes a fuselage 20, extending longitudinally from the forward end 14 of the aircraft 10 towards the aft end 16 of the aircraft 10, and a plurality of wings 22 including a first wing 22a and a second wing 22b. The first wing 22a extends outwardly from the fuselage 20 generally along the transverse direction T with respect to the longitudinal direction L, from the port side 24 of the fuselage 20. Further, the second wing 22b similarly extends outwardly from the fuselage 20, generally along the transverse direction T with respect to the longitudinal direction L, from a starboard side 26 of the fuselage 20. Each of the plurality of wings 22 includes one or more leading edge flaps 28 and one or more trailing edge flaps 30.

Referring still to FIGS. 1A and 1B, the aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40. However, in other exemplary embodiments of the present disclosure, the aircraft 10 may additionally or alternatively include any other suitable configuration of stabilizers that may or may not extend directly along the vertical direction V or horizontal/transverse direction T. Additionally, alternative stabilizers may be any suitable shape, size, configuration, or orientation while remaining within the scope of the present disclosure.

The aircraft 10 also includes a propulsion system. The exemplary propulsion system depicted includes a plurality of engines 42, at least one of which is mounted to each of the plurality of wings 22. Specifically, the plurality of engines 42 includes a first engine 42a mounted to the first wing 22a and a second engine 42b mounted to the second wing 22b. In some embodiments, the plurality of engines 42 may be configured as turbofan jet engines (see, e.g., FIG. 2) suspended beneath the plurality of wings 22 in an under-wing configuration. Alternatively, however, in other exemplary embodiments any other suitable aircraft engine may be provided.

The fuel storage system 11 includes one or more fuel tanks 46 (shown schematically by dashed lines in FIG. 1A) for storing one or more types of fuels that are used in the propulsion system, for example, by the plurality of engines 42. The fuels include a kerosene-based jet fuel, such as, for example, Jet A, Jet A-1, jet propellant 5 (JP-5), or jet propellant 8 (JP-8). The fuels can include any type of aviation fuel used to power aircraft. The one or more fuel tanks 46 include a first fuel tank 46a located in the fuselage 20 adjacent to a location where the wings 22 are coupled to the fuselage 20. In some embodiments, the one or more fuel tanks 46 include one or more second fuel tanks 46b. At least a portion of the one or more second fuel tanks 46b is located in the wings 22. For example, the first wing 22a includes a second fuel tank 46b and the second wing 22b includes a second fuel tank 46b. The one or more fuel tanks 46 may be located at any suitable locations along the fuselage 20, the wings 22, or the plurality of engines 42. The one or more fuel tanks 46 may be made from any type of fuel tank material, such as, for example, titanium, steel, aluminum, alloys, composites, or the like.

Figure 2:
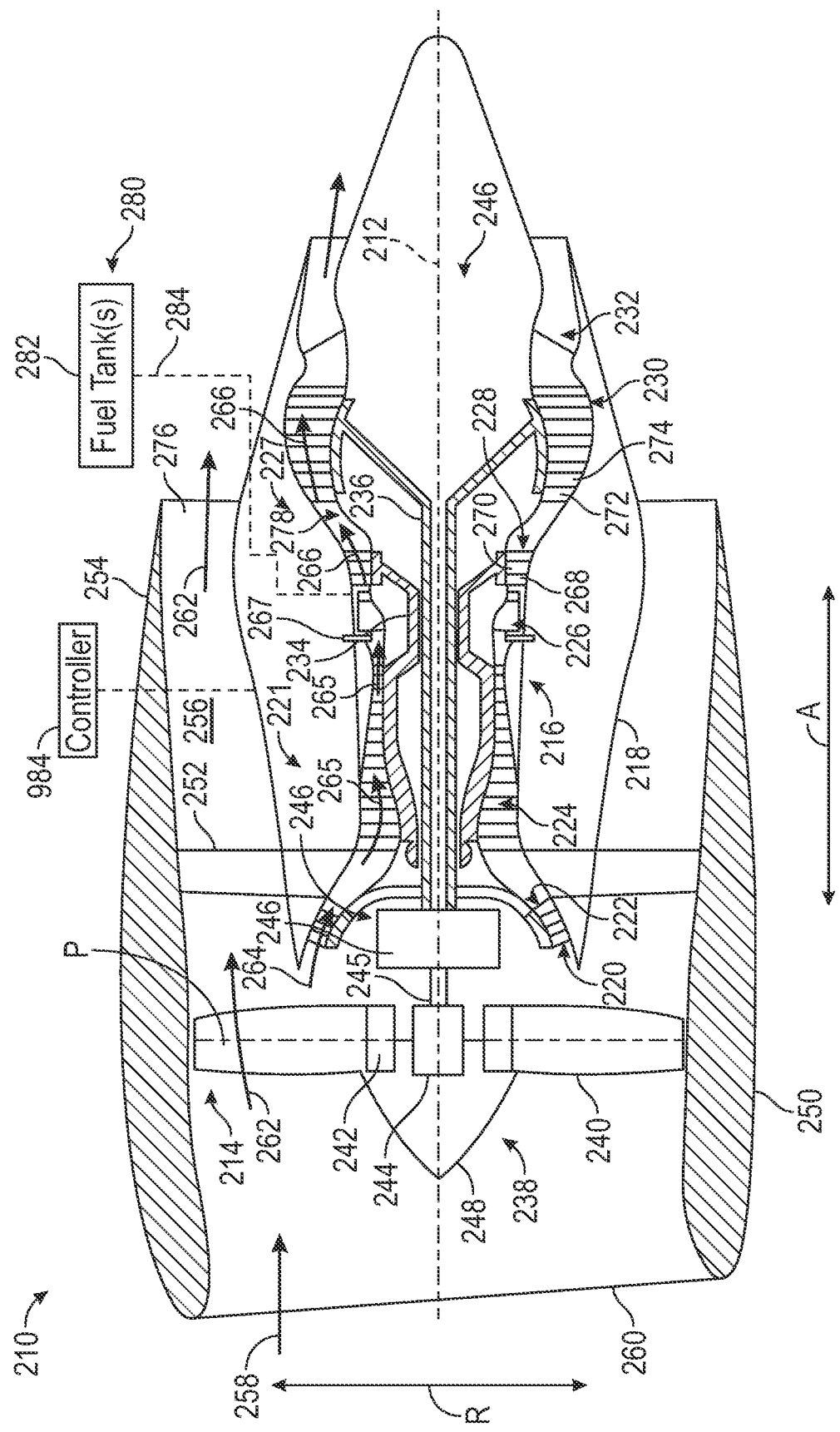
FIG. 2 is a schematic cross-sectional diagram of a turbine engine, taken along a centerline axis of the turbine engine, according to the present disclosure.

FIG. 2 is a schematic cross-sectional diagram of a turbine engine 210, taken along a centerline axis of the turbine engine 210, according to an embodiment of the present disclosure. The turbine engine 210 can be utilized for the plurality of engines 42 shown in FIGS. 1A and 1B. As shown in FIG. 2, the turbine engine 210 defines an axial direction A (extending parallel to a longitudinal, centerline axis 212 provided for reference) and a radial direction R that is normal to the axial direction A. In general, the turbine engine 210 includes a fan section 214 and a core turbine engine 216 disposed downstream from the fan section 214.

The core turbine engine 216 depicted generally includes an outer casing 218 that is substantially tubular and defines an annular inlet 220. As schematically shown in FIG. 2, the outer casing 218 encases, in serial flow relationship, a compressor section 221 including a booster or a low pressure (LP) compressor 222 followed downstream by a high pressure (HP) compressor 224, a combustion section 226, a turbine section 227 including a high pressure (HP) turbine 228 followed downstream by a low pressure (LP) turbine 230, and a jet exhaust nozzle section 232. A high pressure (HP) shaft 234 or a spool drivingly connects the HP turbine 228 to the HP compressor 224 to rotate the HP turbine 228 and the HP compressor 224 in unison. A low pressure (LP) shaft 236 drivingly connects the LP turbine 230 to the LP compressor 222 to rotate the LP turbine 230 and the LP compressor 222 in unison. The compressor section 221, the combustion section 226, the turbine section 227, and the jet exhaust nozzle section 232 together define a core air flowpath.

For the embodiment depicted in FIG. 2, the fan section 214 includes a fan 238 (e.g., a variable pitch fan) having a plurality of fan blades 240 coupled to a disk 242 in a spaced apart manner. As depicted in FIG. 2, the fan blades 240 extend outwardly from the disk 242 generally along the radial direction R. Each fan blade 240 is rotatable relative to the disk 242 about a pitch axis P by virtue of the fan blades 240 being operatively coupled to an actuation member 244 configured to collectively vary the pitch of the fan blades 240 in unison. The fan blades 240, the disk 242, and the actuation member 244 are together rotatable about the centerline axis 212 via a fan shaft 245 that is powered by the LP shaft 236 across a power gearbox, also referred to as a gearbox assembly 246. The gearbox assembly 246 is shown schematically in FIG. 2. The gearbox assembly 246 includes a plurality of gears for adjusting the rotational speed of the fan shaft 245 and, thus, the fan 238 relative to the LP shaft 236 to a more efficient rotational fan speed.

Referring still to the exemplary embodiment of FIG. 2, the disk 242 is covered by a rotatable fan hub 248 aerodynamically contoured to promote an airflow through the plurality of fan blades 240. In addition, the fan section 214 includes an annular fan casing or a nacelle 250 that circumferentially surrounds the fan 238 and/or at least a portion of the core turbine engine 216. The nacelle 250 is supported relative to the core turbine engine 216 by a plurality of circumferentially spaced outlet guide vanes 252. Moreover, a downstream section 254 of the nacelle 250 extends over an outer portion of the core turbine engine 216 to define a bypass airflow passage 256 therebetween.

During operation of the turbine engine 210, a volume of air 258 enters the turbine engine 210 through an inlet 260 of the nacelle 250 and/or the fan section 214. As the volume of air 258 passes across the fan blades 240, a first portion of air 262 is directed or routed into the bypass airflow passage 256, and a second portion of air 264 is directed or routed into the upstream section of the core air flowpath, or, more specifically, into the annular inlet 220 of the LP compressor 222. The ratio between the first portion of air 262 and the second portion of air 264 is commonly known as a bypass ratio. The pressure of the second portion of air 264 is then increased, generating compressed air 265, and the compressed air 265 is routed through the HP compressor 224 and into the combustion section 226, where the compressed air 265 is mixed with fuel 267 and burned to generate combustion gases 266.

The combustion gases 266 are routed into the HP turbine 228 and expanded through the HP turbine 228 where a portion of thermal and/or of kinetic energy from the combustion gases 266 is extracted via sequential stages of HP turbine stator vanes 268 that are coupled to the outer casing 218 and HP turbine rotor blades 270 that are coupled to the HP shaft 234, thus, causing the HP shaft 234 to rotate, thereby supporting operation of the HP compressor 224. The combustion gases 266 are then routed into the LP turbine 230 and expanded through the LP turbine 230. Here, a second portion of thermal and kinetic energy is extracted from the combustion gases 266 via sequential stages of LP turbine stator vanes 272 that are coupled to the outer casing 218 and LP turbine rotor blades 274 that are coupled to the LP shaft 236, thus, causing the LP shaft 236 to rotate, thereby supporting operation of the LP compressor 222 and rotation of the fan 238 via the gearbox assembly 246.

The combustion gases 266 are subsequently routed through the jet exhaust nozzle section 232 of the core turbine engine 216 to provide propulsive thrust. Simultaneously, the pressure of the first portion of air 262 is substantially increased as the first portion of air 262 is routed through the bypass airflow passage 256 before being exhausted from a fan nozzle exhaust section 276 of the turbine engine 210, also providing propulsive thrust. The HP turbine 228, the LP turbine 230, and the jet exhaust nozzle section 232 at least partially define a hot gas path 278 for routing the combustion gases 266 through the core turbine engine 216.

As detailed above, the second portion of air 264 is mixed with the fuel 267 in the combustion section 226 to produce the combustion gases 266. The turbine engine 210 also includes a fuel delivery system 280 for providing the fuel 267 to the combustion section 226. The fuel delivery system 280 includes a fuel tank 282 and one or more fuel delivery lines 284 that form a fuel flowpath from the fuel tank 282 to the combustion section 226. The fuel delivery system 280 can be considered part of the aircraft 10 (FIGS. 1A and 1B). For example, the fuel tank 282 can be utilized as the one or more fuel tanks 46 of FIG. 1A.

The turbine engine 210 depicted in FIG. 2 is by way of example only. In other exemplary embodiments, the turbine engine 210 may have any other suitable configuration. For example, in other exemplary embodiments, the fan 238 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

A controller 984 is in communication with the turbine engine 210 for controlling aspects of the turbine engine 210. For example, the controller 984 is in two-way communication with the turbine engine 210 for receiving signals from various sensors and control systems of the turbine engine 210, and for controlling components of the turbine engine 210 and/or of the aircraft 10 (FIGS. 1A and 1B), as detailed further below. The controller 984, or components thereof, may be located onboard the turbine engine 210, onboard the aircraft 10 (FIGS. 1A and 1B), or can be located remote from each of the turbine engine 210 and the aircraft 10.

Figure 3:
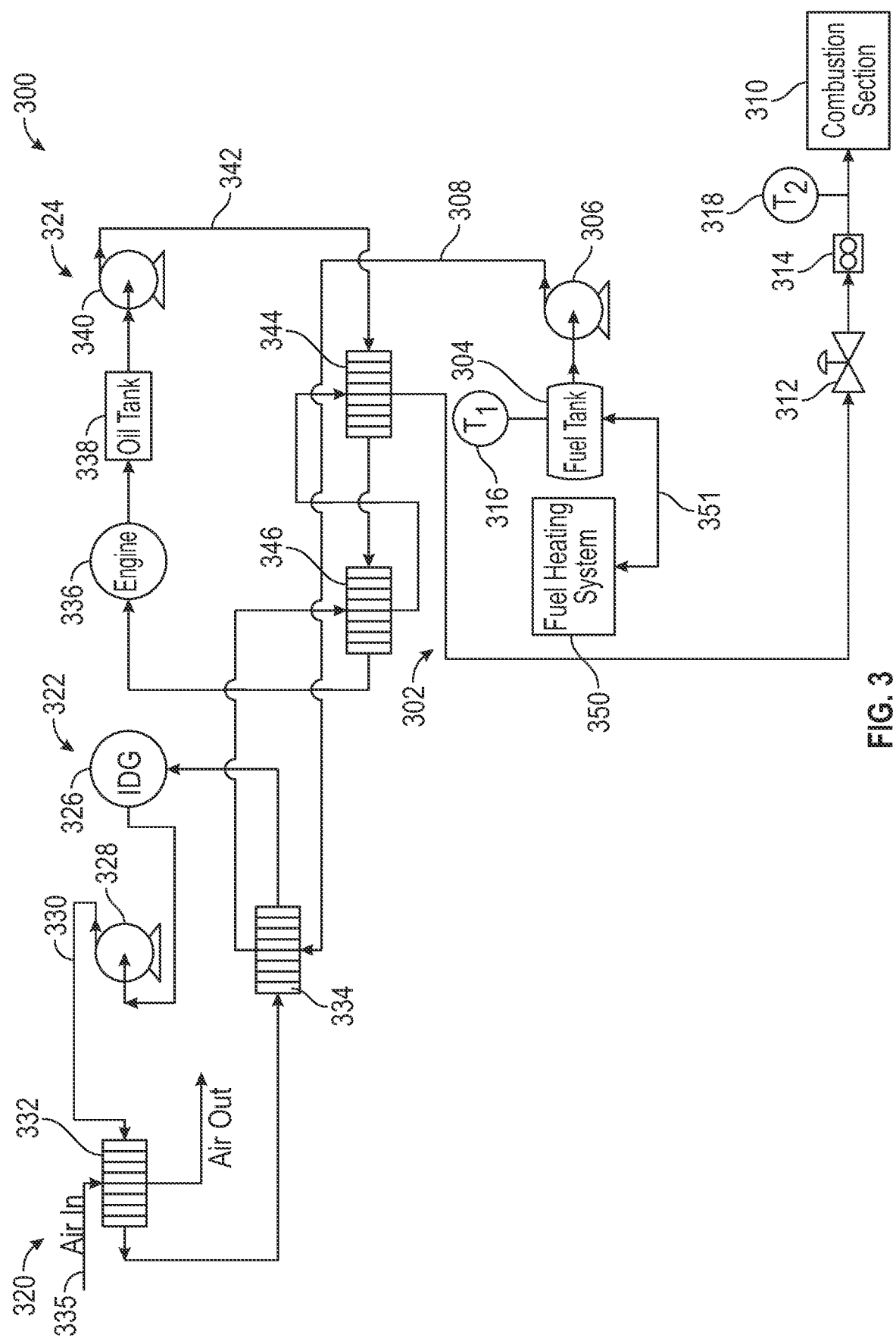
FIG. 3 is a schematic flow diagram of a fuel delivery system with a fuel storage system for the turbine engine of FIG. 2, according to the present disclosure.

FIG. 3 is a schematic flow diagram of a fuel delivery system 300 with a fuel storage system 302 for the turbine engine 210 of FIG. 2, according to the present disclosure. The fuel storage system 302 includes a fuel tank 304, a fuel pump 306, and a fuel delivery line 308. The fuel tank 304 stores fuel and can be utilized as any of the fuel tanks detailed herein. The fuel pump 306, as well as any other pump included in the fuel delivery system 300, can have any suitable configuration. For example, the fuel pump 306 can be powered by an electrical input, can be a turbopump (e.g., comprising a turbine and a pump), etc. The fuel pump 306 pumps, or drives, the fuel from the fuel tank 304 along the fuel delivery line 308. The fuel flows through the fuel delivery line 308 and directs the fuel to a combustion section 310 of an engine, where the fuel mixes with air to generate a fuel-air mixture and the fuel-air mixture is burned to generate combustion gases. The combustion section 310 can be utilized as the combustion section 226 of FIG. 2.

In some embodiments, the fuel delivery line 308 includes a metering valve 312 and a flowmeter 314. The metering valve 312 is used to control the flow rate of the fuel in the fuel delivery line 308 to the combustion section 310 to ensure a constant flow rate of the fuel to the combustion section 310. The flowmeter 314 is a sensor that measures the flow rate of the fuel in the fuel delivery line 308 to the combustion section 310. A controller (e.g., the controller 984 of FIGS. 2 and 7) can be used to control actuation of the metering valve 312 based on the flow rate measurements of the flowmeter 314.

The fuel delivery system 300 also includes one or more temperature sensors for measuring a temperature of the fuel. The one or more temperature sensors include a first temperature sensor 316 at the fuel tank 304 for measuring a first temperature $T_1$ of the fuel in the fuel tank 304 and generating a first temperature signal indicative of the first temperature $T_1$. The one or more temperature sensors also include a second temperature sensor 318 at the fuel delivery line 308 for measuring a second temperature $T_2$ of the fuel in the fuel delivery line 308 and generating a second temperature signal indicative of the second temperature $T_2$. The second temperature sensor 318 is positioned in the fuel delivery line 308 downstream of the metering valve 312 and upstream of the combustion section 310. In this way, the second temperature sensor 318 measures the second temperature $T_2$ of the fuel just prior to the fuel being delivered to the combustion section 310. A controller (e.g., the controller 984 shown in FIGS. 2 and 7) receives the temperature signals from the first temperature sensor 316 and from the second temperature sensor 318, and controls aspects of the fuel delivery system 300, as detailed further below.

The fuel delivery system 300 also includes a thermal management system 320. The thermal management system 320 manages thermal transients of one or more systems of the engine (e.g., the turbine engine 210 of FIG. 2) and/or of the aircraft 10 (FIGS. 1A and 1B) in which the engine is installed. For example, to manage thermal transients, the thermal management system 320 is used to cool one or more thermal loads of the engine or of the aircraft. To improve propulsive efficiency of the engine, the thermal management system 320 is used to heat the fuel and to store the heated fuel for use during certain operational modes of the engine or of the aircraft, as detailed further below.

The thermal management system 320 includes the fuel storage system 302. The thermal management system 320 also includes a first cooling system 322 and a second cooling system 324. The first cooling system 322 includes an integrated drive generator (IDG) 326, a first oil pump 328, a first oil line 330, an air-cooled oil cooler 332, and a first fuel-cooled oil cooler 334. The first cooling system 322 can be utilized as a cooling system for cooling oil for the IDG 326. The IDG 326 is an electrical generator for powering electrical systems and/or control systems of the aircraft. For example, the IDG 326 uses kinetic energy from the engines and converts the kinetic energy into electrical energy. The first oil pump 328 pumps, or drives, oil from the IDG 326 (or from an oil tank) along the first oil line 330. In this way, the oil is circulated to flow through the first oil line 330.

The air-cooled oil cooler 332 is a heat exchanger that includes the first oil line 330 and an air flowpath 335. In operation, cooling air (e.g., ambient air) flows through the air flowpath 335 into the air-cooled oil cooler 332 (e.g., "Air In") to cool the oil in the first oil line 330 as the oil passes through the air-cooled oil cooler 332. For example, the air passes along an outer surface of the first oil line 330 within the air-cooled oil cooler 332 to cool the oil in the first oil line 330 as the oil passes through the air-cooled oil cooler 332. In this way, the air absorbs heat from the oil in the air-cooled oil cooler 332. The air is then directed out of the air-cooled oil cooler 332 and subsequently out of the aircraft (e.g., "Air Out").

The first fuel-cooled oil cooler 334 is a heat exchanger that includes the first oil line 330 and the fuel delivery line 308. For example, the fuel delivery line 308, and, thus, the fuel in the fuel delivery line 308, passes through the first fuel-cooled oil cooler 334. In operation, the fuel flows through the fuel delivery line 308 into the first fuel-cooled oil cooler 334 to cool the oil in the first oil line 330 as the oil passes through the first fuel-cooled oil cooler 334. For example, the fuel passes along an outer surface of the first oil line 330 within the first fuel-cooled oil cooler 334 to cool the oil in the first oil line 330 as the oil passes through the first fuel-cooled oil cooler 334. In this way, the fuel in the fuel delivery line 308 absorbs heat from the oil in the first fuel-cooled oil cooler 334. The oil in the first oil line 330 is then directed back to the IDG 326 to lubricate components of the IDG 326. The oil is then recirculated to flow through the first oil line 330. The fuel in the fuel delivery line 308 is directed from the first fuel-cooled oil cooler 334 to the second cooling system 324, as detailed further below.

The second cooling system 324 includes an engine 336, an oil tank 338, a second oil pump 340, a second oil line 342, a second fuel-cooled oil cooler 344, and a third fuel-cooled oil cooler 346. The second cooling system 324 can be utilized as a cooling system for cooling oil for the engine 336. The engine 336 can be utilized as any of the engines disclosed herein. The oil tank 338 stores oil therein and can collect spent oil from the engine 336. The second oil pump 340 pumps, or drives, oil from the oil tank 338 along the second oil line 342. In this way, the oil is circulated to flow through the second oil line 342.

The second fuel-cooled oil cooler 344 is a heat exchanger that includes the second oil line 342 and the fuel delivery line 308. For example, the fuel delivery line 308, and, thus, the fuel in the fuel delivery line 308, passes through the second fuel-cooled oil cooler 344. The third fuel-cooled oil cooler 346 is a heat exchanger that includes the second oil line 342 and the fuel delivery line 308. For example, the fuel delivery line 308, and, thus, the fuel in the fuel delivery line 308, passes through the third fuel-cooled oil cooler 346.

In operation, the oil flows through the second oil line 342, through the second fuel-cooled oil cooler 344, through the third fuel-cooled oil cooler 346, and is then directed to the engine 336 to lubricate components of the engine 336. Spent oil is then collected back into the oil tank 338 and the oil in the oil tank 338 can be recirculated to flow through the second oil line 342. At the same time, the fuel in the fuel delivery line 308 passes through the second fuel-cooled oil cooler 344 and passes through the third fuel-cooled oil cooler 346 to cool the oil. As the oil passes through the second fuel-cooled oil cooler 344, the fuel flows through the fuel delivery line 308 into the second fuel-cooled oil cooler 344 to cool the oil in the second oil line 342. For example, the fuel passes along an outer surface of the second oil line 342 within the second fuel-cooled oil cooler 344 to cool the oil in the second oil line 342 as the oil passes through the second fuel-cooled oil cooler 344. In this way, the fuel in the fuel delivery line 308 absorbs heat from the oil in the second fuel-cooled oil cooler 344. Similarly, as the oil passes through the third fuel-cooled oil cooler 346, the fuel flows through the fuel delivery line 308 into the third fuel-cooled oil cooler 346 to cool the oil in the second oil line 342. For example, the fuel passes along an outer surface of the second oil line 342 within the third fuel-cooled oil cooler 346 to cool the oil in the second oil line 342 as the oil passes through the third fuel-cooled oil cooler 346. In this way, the fuel in the fuel delivery line 308 absorbs heat from the oil in the third fuel-cooled oil cooler 346.

The oil in the second oil line 342 is then directed back to the engine 336 to lubricate components of the engine 336. The oil is then recirculated to flow through the second oil line 342. In the exemplary embodiment, the fuel in the fuel delivery line 308 is directed from the first fuel-cooled oil cooler 334 to the third fuel-cooled oil cooler 346, and from the third fuel-cooled oil cooler 346 to the second fuel-cooled oil cooler 344. The thermal management system 320, however, can include any arrangement of heat exchangers for cooling components of the engine and/or of the aircraft. The fuel is then directed to the combustion section 310 to mix with air and is ignited to produce combustion gases, as detailed above. In this way, the temperature of the fuel increases as the fuel flows through the fuel delivery line 308 and absorbs heat through the heat exchangers. The heated fuel is then delivered to the combustion section 310 and provides improved propulsive efficiency for the engine.

In some embodiments, the fuel delivery system 300 includes a fuel heating system 350. The fuel heating system 350 can include a fuel heating line 351, pumps, heat exchangers, heaters, or the like, for circulating fuel from the fuel tank 304 to heat the fuel and to return the heated fuel to the fuel tank 304 for storing the heated fuel. For example, the fuel from the fuel tank 304 can flow through the fuel heating line 351 into the fuel heating system. The fuel heating system 350 can use the fuel from the fuel tank 304 to cool components of the engine and/or of the aircraft, thereby heating the fuel in the fuel heating system 350. The heated fuel is then returned to the fuel tank 304 through the fuel heating line 351 and stored in the fuel tank 304. In some embodiments, the fuel in the fuel tank 304 is heated without circulating the fuel from the fuel tank 304. In some instances, the heated fuel in the fuel tank 304 may become too hot (e.g., the temperature of the heated fuel in the fuel tank 304 increases above a threshold) such that the fuel that is delivered to the combustion section 310 cooks, and carbonaceous deposits (also known as coke) are produced in the fuel. Accordingly, the present disclosure provides for a fuel tank heat rejection system for cooling the fuel in the fuel tank, as detailed further below.

FIG. 4 is a schematic flow diagram of a fuel delivery system 400 with a fuel tank heat rejection system 403 for the aircraft 10 shown in FIGS. 1A and 1B, according to the present disclosure. The fuel delivery system 400 can include many of the same or similar components as the fuel delivery system 300 of FIG. 3. For clarity, FIG. 4 does not show the pumps, the fuel delivery line, or the thermal management system. The fuel delivery system 400, however, may include such components.

The fuel delivery system 400 includes a fuel storage system 402 with a fuel tank heat rejection system 403 for a fuel tank 404. The fuel tank 404 stores fuel for use by the combustion section of the engine. The fuel delivery system 400 also includes a fuel heating system 450 with a fuel heating line 451 for providing fluid communication to and from the fuel tank 404. The fuel heating system 450 circulates the fuel to cause the fuel to flow from the fuel tank 404, heats the fuel (e.g., the fuel absorbs heat through one or more heat exchangers from various systems of the engine or of the aircraft), and returns the heated fuel to the fuel tank 404. The fuel tank 404 is located in a fuel tank compartment 460 of an aircraft, such as the aircraft 10 shown in FIGS. 1A and 1B. In the exemplary embodiment, the fuel tank 404 is utilized as the first fuel tank 46a of FIG. 1A. In some embodiments, the fuel tank 404 is located in a wing of the aircraft and is utilized as the second fuel tank 46b of FIG. 1B. The fuel tank 404 includes a temperature sensor 416 for measuring the temperature (e.g., the first temperature $T_1$) of the fuel in the fuel tank 404.

The fuel tank heat rejection system 403 includes one or more fins 405 coupled to, and extending from, the fuel tank 404. The one or more fins 405 (shown schematically in FIG. 4) provide an increased external surface area for the fuel tank 404 such that cooling air can pass over the fins to cool the fuel tank 404, as detailed further below. The one or more fins 405 can include any length, any width, and/or any thickness, as desired, for transferring heat from the fuel and out of the fuel tank 404. The one or more fins 405 are made from a lightweight material with a high thermal conductivity coefficient, such as, for example, aluminum, beryllium, or the like. In FIG. 4, the one or more fins 405 include eight such fins each extending laterally from the fuel tank 404. The one or more fins 405 may include any number of fins as desired. The one or more fins 405 include a first set of fins 405a and a second set of fins 405b. The first set of fins 405a extends from a first side of the fuel tank 404 and the second set of fins 405b extends from a second side of the fuel tank 404 opposite the first side. The one or more fins 405 extend into the fuel tank 404 and absorb heat from the fuel in the fuel tank 404. The one or more fins 405 add an increased surface area to the fuel tank 404 such that cooling air (e.g., ambient air) contacts the one or more fins 405 and cools the one or more fins 405, thereby rejecting the heat and cooling the fuel in the fuel tank 404, as detailed further below.

The fuel tank heat rejection system 403 also includes one or more air valves 462 and one or more air vents 464 located on the fuel tank compartment 460. The one or more air valves 462 provide fluid communication from the atmosphere (e.g., outside the aircraft) to the fuel tank compartment 460. The one or more air valves 462 can each include any type of air valve that is controlled by a controller (e.g., the controller 984 of FIGS. 2 and 9) to open and to close. In this way, the one or more air valves 462 are controlled to open to allow cooling air, such as ambient air 466, into the fuel tank compartment 460 (e.g., "Air In"). The one or more air vents 464 provide fluid communication from the fuel tank compartment 460 to the atmosphere. The one or more air vents 464 include one or more louvers 465 that are controlled by the controller to open and to close. In this way, the one or more air vents 464 are controlled to open to allow the ambient air 466 to exit the fuel tank compartment 460 (e.g., "Air Out"). For example, the one or more louvers 465 are controlled to actuate to open the one or more air vents 464. In some embodiments, the cooling air is provided by a pump, such as an air pump, and/or can be provided from other systems of the aircraft or of the engines.

In operation, the fuel heating system 450 heats the fuel, and the heated fuel is directed through the fuel heating line 451 into the fuel tank 404, as detailed above. The fuel tank 404 stores the heated fuel and the heated fuel increases the temperature of the fuel tank 404. The one or more fins 405 absorb the heat from the heated fuel in the fuel tank 404. When the temperature (e.g., the first temperature $T_1$) of the fuel in the fuel tank 404 increases above a high temperature threshold, the fuel tank heat rejection system 403 is controlled to open and to allow ambient air 466 into the fuel tank compartment 460. For example, the one or more air valves 462 and the one or more air vents 464 are controlled to open, and the ambient air 466 flows through the fuel tank compartment 460. While the one or more air valves 462 and the one or more air vents 464 are open, the ambient air 466 is operably directed into the fuel tank compartment 460 and is operably directed to pass by, and to contact, each of the one or more fins 405 and to exit through the one or more air vents 464. When the one or more air valves 462 and the one or more air vents 464 are open, the ambient air 466 cools the one or more fins 405, thereby rejecting the heat from the fuel tank 404 (as shown by arrow 468) and cooling the fuel tank 404.

The one or more air valves 462 and the one or more air vents 464 are controlled to close to prevent the ambient air 466 from entering and from exiting the fuel tank compartment 460. For example, the one or more louvers 465 are controlled to actuate and to close. In this way, when the fuel in the fuel tank 404 is cooled to a predetermined temperature (or to a predetermined temperature range), the fuel tank heat rejection system 403 prevents the flow of ambient air into the fuel tank compartment 460. The one or more air valves 462 can include any number of air valves, as desired, and the one or more air vents 464 can include any number of air vents, as desired. While the one or more air vents 464 are detailed as having one or more louvers 465, the one or more air vents 464 can include any type of vent or any type of air valve that can be controlled to open and to close.

Figure 5:
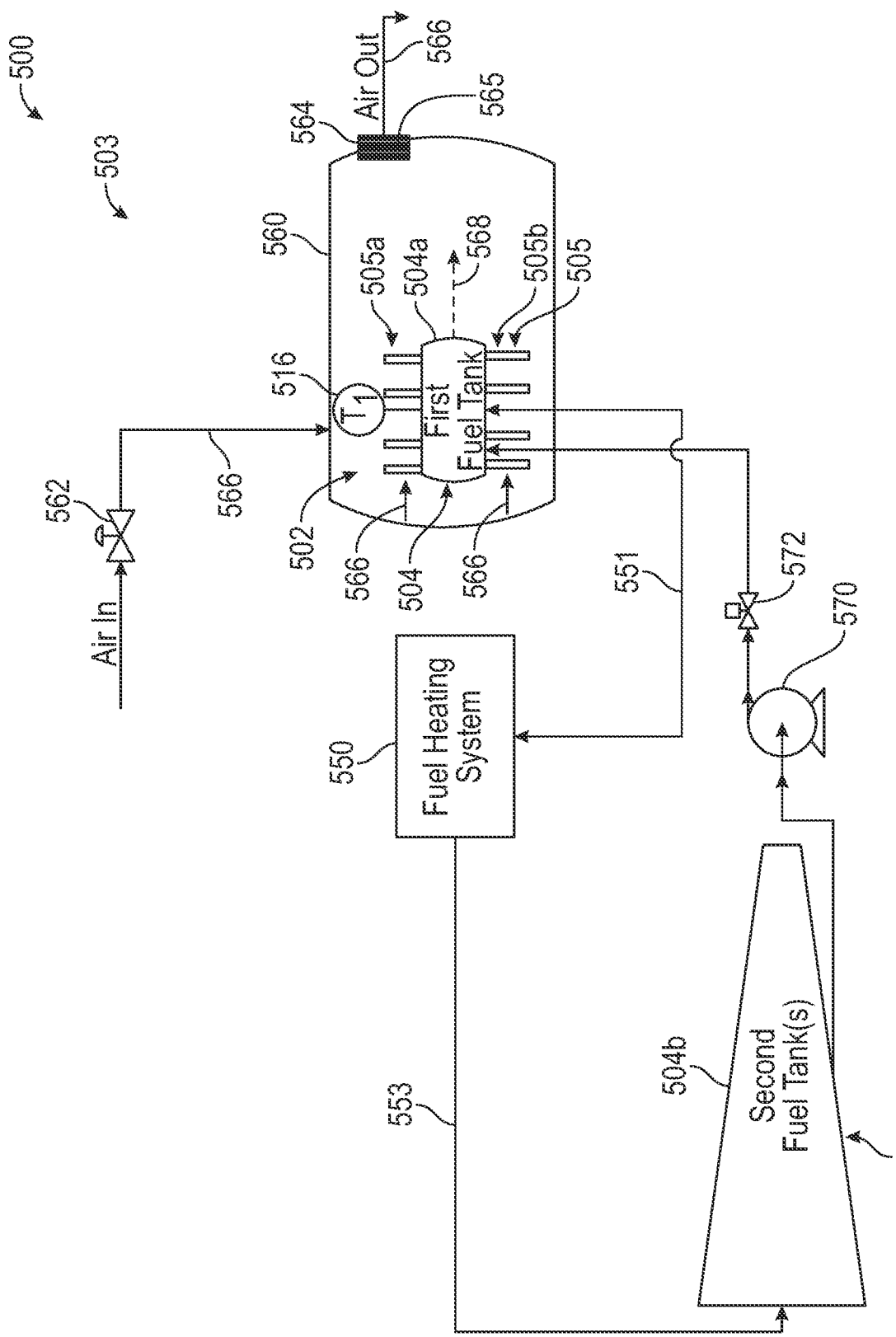
FIG. 5 is a schematic flow diagram of a fuel delivery system with a fuel tank heat rejection system for the aircraft of FIGS. 1A and 1B, according to another embodiment.

FIG. 5 is a schematic flow diagram of a fuel delivery system 500 with a fuel tank heat rejection system 503 for the aircraft 10 of FIGS. 1A and 1B, according to another embodiment. The fuel delivery system 500 can include many of the same or similar components as the fuel delivery system 300 of FIG. 3. For clarity, FIG. 5 does not show the pumps, the fuel delivery line, or the thermal management system. The fuel delivery system 500, however, may include such components.

The fuel delivery system 500 includes many of the same or similar components as the fuel delivery system 400 of FIG. 4. The fuel delivery system 500, however, includes a fuel storage system 502 with a fuel tank heat rejection system 503 for a plurality of fuel tanks 504. The plurality of fuel tanks 504 include a first fuel tank 504a and one or more second fuel tanks 504b. The first fuel tank 504a can be utilized as the first fuel tank 46a of FIG. 1A. The one or more second fuel tanks 504b can be utilized as the second fuel tanks 46b of FIG. 1A. In this way, the first fuel tank 504a is located in a fuel tank compartment 560 and the one or more second fuel tanks 46b are located in a respective wing 22 (FIG. 1A) of the aircraft. The fuel delivery system 500 also includes a fuel heating system 550 with a first fuel heating line 551 for providing fluid communication to and from the first fuel tank 504a. The fuel heating system 550 includes a second fuel heating line 553 for providing fluid communication to the second fuel tank 504b. The fuel heating system 550 includes a fuel pump 570 and a fuel valve 572 disposed in the second fuel heating line 553. When the fuel heating system 550 is utilized in the fuel delivery system 300, the fuel pump 570 is referred to as a second fuel pump. The fuel pump 570 pumps, or drives, the fuel from the one or more second fuel tanks 504b along the second fuel heating line 553. The fuel valve 572 is controlled to be open to allow the fuel to flow from the one or more second fuel tanks 504b into the second fuel heating line 553. The fuel flows through the second fuel heating line 553 and directs the fuel to the first fuel tank 504a. In this way, the fuel is circulated from the one or more second fuel tanks 504b to the first fuel tank 504a and back to the one or more second fuel tanks 504b.

The first fuel tank 504a includes a temperature sensor 516 for measuring the temperature (e.g., the first temperature $T_1$) of the fuel in the first fuel tank 504a. The fuel tank heat rejection system 503 includes one or more fins 505 coupled to, and extending from, the first fuel tank 504a. The one or more fins 505 include a first set of fins 505a and a second set of fins 505b. The fuel tank heat rejection system 503 also includes one or more air valves 562 and one or more air vents 564 (e.g., having one or more louvers 565) located on the fuel tank compartment 560 for allowing ambient air 566 to flow through the fuel tank compartment 560, as detailed above. In operation, the fuel is heated and the heated fuel is stored in the first fuel tank 504a. The fuel tank heat rejection system 503 cools the first fuel tank 504a, as detailed above with respect to the fuel tank heat rejection system 403 of FIG. 4, and the heat of the fuel in the first fuel tank 504a is rejected from the first fuel tank 504a (as shown by arrow 568).

FIG. 6A is a transparent view of a fuel tank 604 having one or more fins 605, according to the present disclosure. While the fuel tank 604 is shown as transparent in FIG. 6A, the fuel tank 604 can be opaque, transparent, and/or semi-transparent. The fuel tank 604 can be utilized as any of the fuel tanks disclosed herein. The fuel tank 604 includes a proximate end 607 and a distal end 609. The fuel tank 604 includes a first longitudinal side 611 extending from the proximate end 607 to the distal end 609 and a second longitudinal side 613 opposite the first longitudinal side 611 and extending from the proximate end 607 to the distal end 609. The fuel tank 604 includes a hollow interior 615 for storing fuel therein. The fuel tank 604 is defined by an exterior surface 617 and an interior surface 619.

The one or more fins 605 each includes a fin surface 621 that includes an exterior portion 623 that extends laterally from the fuel tank 604. For example, the exterior portion 623 extends laterally from the exterior surface 617 of the fuel tank 604. The exterior portion 623 includes one or more walls 625 that extend generally perpendicularly with respect to the first longitudinal side 611. The ambient air that passes by the one or more fins 605 contacts the one or more walls 625 to cool the one or more fins 605, thereby cooling the fuel tank 604. While the one or more fins 605 include straight fins having a uniform cross section, the one or more fins 605 can include any size or any shape for providing a heat transfer surface extending from the fuel tank 604. For example, the one or more fins 605 can include straight fins having a non-uniform cross section, annular fins, pin fins, or any type of heat transfer surface or combinations thereof.

The fin surface 621 includes an interior portion 627 that extends into the hollow interior 615 of the fuel tank 604. The interior portion 627 of each fin 605 includes a rib 629 and a ramp portion 631. The ramp portion 631 decreases in height from the exterior portion 623 to the rib 629 in an area in which the fin 605 extends into the hollow interior 615. Thus, a height of the rib 629 is less than a height of the exterior portion 623. The ramp portion 631 extends from the interior surface 619 of the first longitudinal side 611 to the rib 629. The rib 629 extends from the ramp portion 631 to the interior surface 619 of the second longitudinal side 613. In this way, the interior portion 627 of a respective fin 605 extends from the interior surface 619 of the first longitudinal side 611 to the interior surface 619 of the second longitudinal side 613 of the fuel tank 604, thereby extending an entire length of the hollow interior 615. In some embodiments, the one or more fins 605 do not include a ramp portion 631 such that the height of the rib 629 is substantially equal to the height of the exterior portion 623.

Each of the fins 605 is spaced longitudinally along the fuel tank 604 such that a space or a gap 633 exists between each of the one or more fins 605. In this way, the fuel in the fuel tank 604 can fill the gap 633 between the rib 629 of each of the one or more fins 605 when the fuel is stored in the fuel tank 604. While FIG. 6A shows the one or more fins 605 on only the first longitudinal side 611 of the fuel tank 604, the fuel tank 604 can also include one or more fins 605 extending from the second longitudinal side 613. The one or more fins 605 can extend from any side of the fuel tank 604 and can include any number of fins 605, as desired. For example, the fuel tank 604 can include fins extending from the proximate end 607, the distal end 609, the first longitudinal side 611, the second longitudinal side 613, a top side of the fuel tank 604, a bottom side of the fuel tank 604, or combinations thereof.

FIG. 6B is a schematic cross-sectional diagram of the fuel tank 604 having the one or more fins 605, taken at detail 6B-6B, according to the present disclosure. As shown in FIG. 6B, the one or more fins 605 are solid fins made from a solid material. In operation, the fuel in the fuel tank 604 is heated, as detailed above, and the interior portion 627 of each of the one or more fins 605 absorbs the heat (as indicated by the arrows 667) from the heated fuel in the fuel tank 604. The heat is transferred throughout each of the one or more fins 605. For example, the heat is transferred or is distributed through the solid material of the one or more fins 605 from the interior portion 627 to the exterior portion 623. The cooling air (e.g., the ambient air) is operably directed by, and contacts, the exterior portion 623 of each of the one or more fins 605, thereby cooling the one or more fins 605. In this way, the heat is rejected from the fuel tank 604 (as indicated by the arrows 668) and the fuel in the fuel tank 604 is cooled.

Figure 7:
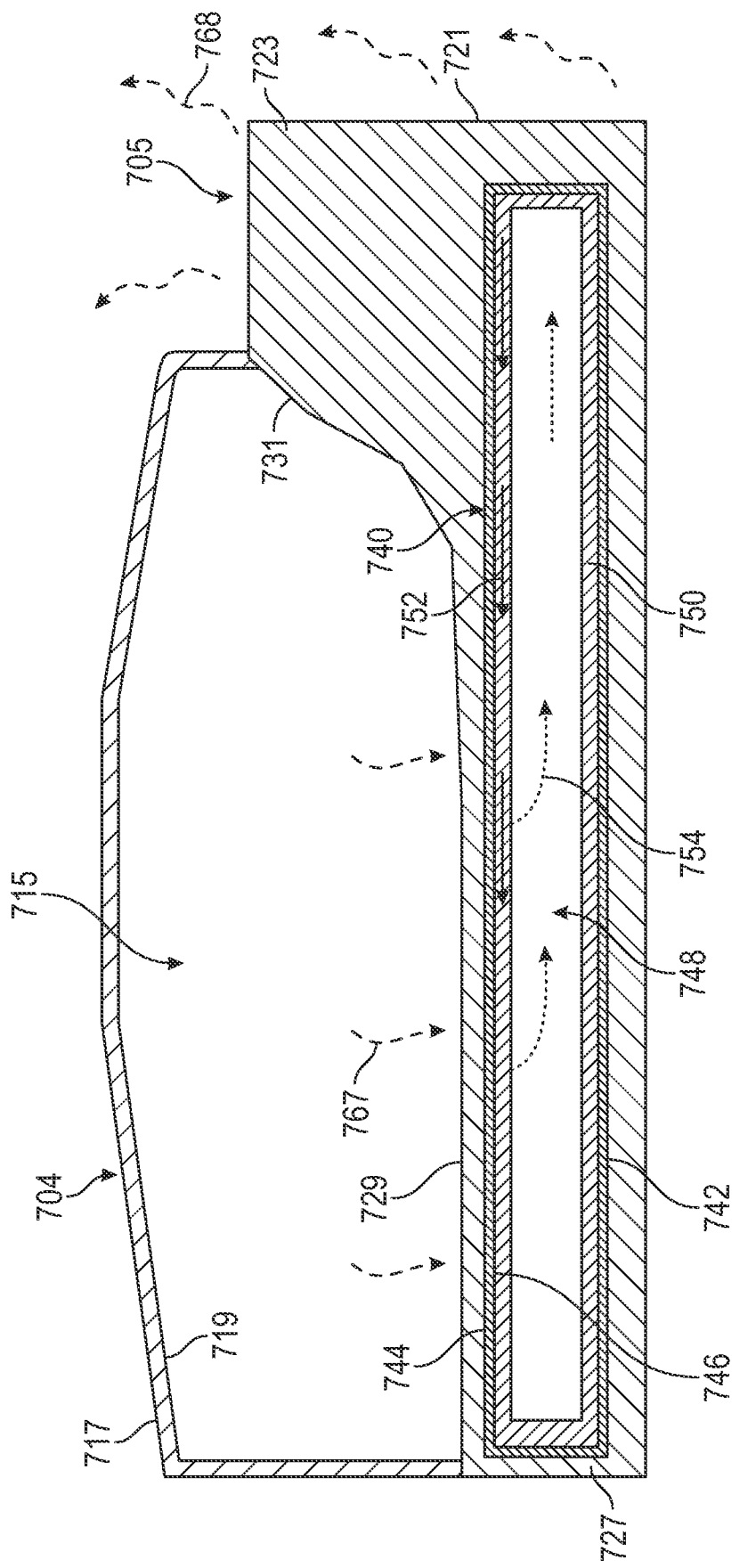
FIG. 7 is a schematic cross-sectional diagram of a fuel tank having one or more fins, taken along a centerline axis of the fuel tank, according to another embodiment.

FIG. 7 is a schematic cross-sectional diagram of a fuel tank 704 having one or more fins 705, taken along a centerline axis of the fuel tank 704, according to another embodiment. The fuel tank 704 is substantially similar to the fuel tank 604 of FIG. 6A. For example, the fuel tank 704 includes a hollow interior 715 and is defined by an exterior surface 717 and an interior surface 719. The one or more fins 705 include a fin surface 721 having an exterior portion 723 and an interior portion 727. The interior portion 727 defines a rib 729, and the exterior portion 723 and the interior portion 727 are connected by a ramp portion 731. In some embodiments, the one or more fins 705 do not include the ramp portion 731.

In the embodiment of FIG. 7, the one or more fins 705 each include a heat pipe 740 that includes a housing 742. The heat pipe 740 is generally cylindrical. The heat pipe 740 can include any shape and/or any size as desired. The heat pipe 740 is disposed within the one or more fins 705 and extends from the interior portion 727 to the exterior portion 723. The housing 742 includes an outer surface 744 and an inner surface 746. The heat pipe 740 defines a hollow chamber 748 therein that contains a vapor. The heat pipe 740 provides a higher effective thermal conductivity fin 705 (e.g., as compared to fins without a heat pipe) in an operating temperature range of the fuel. The operating temperature range of the fuel is between about negative forty degrees Celsius to about one hundred fifty degrees Celsius (about −40° C. to about 150° C.). The hollow chamber 748 is a pressurized chamber. The heat pipe 740 also includes a wick structure 750 disposed within the hollow chamber 748 along the inner surface 746. The wick structure 750 holds and directs a liquid (e.g., water) towards the heated fuel (as indicated by the arrows 752), as detailed further below. The wick structure 750 can include a porous wick or a grooved wick with small gaps that provides for capillary wicking (e.g., the liquid flows within the wick structure 750 without the assistance of external forces, such as, for example, gravity).

In operation, the fuel in the fuel tank 704 is heated, as detailed above, and the interior portion 727 of each of the one or more fins 705 absorbs the heat (as indicated by the arrows 767) from the heated fuel in the fuel tank 704. The heated fuel that contacts the interior portion 727 of each of the one or more fins 705 heats the liquid in the wick structure 750, thereby turning the liquid on the fuel side of the wick structure 750 into vapor. The vapor is released into the hollow chamber 748 and distributes the heat from the interior portion 727 to the exterior portion 723 of the one or more fins 705 (as indicated by the arrows 754). In this way, the heat is transferred to the one or more fins 705 at the exterior portion 723. The cooling air is then operably directed by, and contacts, the exterior portion 723 and absorbs the heat from the one or more fins 705, thereby rejecting the heat from the one or more fins 705 (as indicated by the arrows 768) and cooling the fuel in the fuel tank 704. As the vapor cools in the hollow chamber 748, the vapor turns back into liquid and the liquid is absorbed by the wick structure 750 and is operably directed back to the fuel side of the wick structure 750 (as indicated by the arrows 752). Accordingly, the heat pipe 740 helps to transfer or to distribute the heat from the interior portion 727 to the exterior portion 723 of the one or more fins 705.

Figure 8:
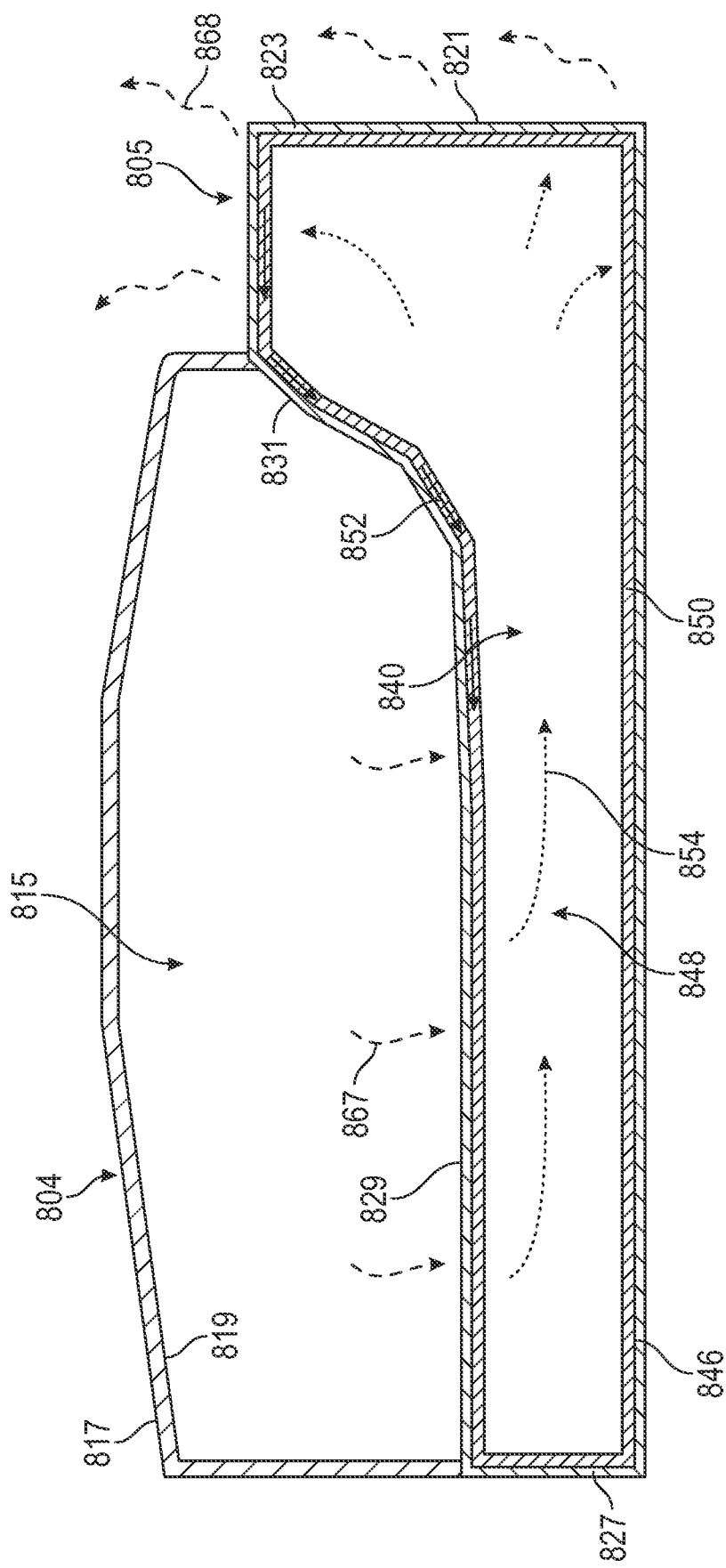
FIG. 8 is a schematic cross-sectional diagram of a fuel tank having one or more fins, taken along a centerline axis of the fuel tank, according to another embodiment.

FIG. 8 is a schematic cross-sectional diagram of a fuel tank 804 having one or more fins 805, taken along a centerline axis of the fuel tank 804, according to another embodiment. The fuel tank 804 is substantially similar to the fuel tank 604 of FIG. 6A and to the fuel tank 704 of FIG. 7. For example, the fuel tank 804 includes a hollow interior 815 and is defined by an exterior surface 817 and an interior surface 819. The one or more fins 805 include a fin surface 821 having an exterior portion 823 and an interior portion 827. The interior portion 827 defines a rib 829, and the exterior portion 823 and the interior portion 827 are connected by a ramp portion 831.

In the embodiment of FIG. 8, the one or more fins 805 each include a vapor chamber 840. The vapor chamber 840 is disposed within the one or more fins 805 and extends from the interior portion 827 to the exterior portion 823. The vapor chamber 840 includes a shape that is defined by the one or more fins 805. For example, the shape of the vapor chamber 840 is substantially similar to the shape of the one or more fins 805. The vapor chamber 840 defines a hollow chamber 848 therein that contains a vapor. The vapor chamber provides a higher effective thermal conductivity fin 805 (e.g., as compared to fins without a vapor chamber) in an operating temperature range of the fuel. The operating temperature range of the fuel is between about negative forty degrees Celsius to about one hundred fifty degrees Celsius (about −40° ° C. to about 150° C.). The hollow chamber 848 is a pressurized chamber. The vapor chamber 840 also includes a wick structure 850 disposed within the hollow chamber 848 along an inner surface 846 of the one or more fins 805. The wick structure 850 holds and directs a liquid (e.g., water) towards the heated fuel (as indicated by the arrows 852), as detailed further below. The wick structure 850 can include a porous wick or a grooved wick with small gaps that provides for capillary wicking (e.g., the liquid flows within the wick structure 850 without the assistance of external forces, such as, for example, gravity).

In operation, the fuel in the fuel tank 804 is heated, as detailed above, and the interior portion 827 of each of the one or more fins 805 absorbs the heat (as indicated by the arrows 867) from the heated fuel in the fuel tank 804. The heated fuel that contacts the interior portion 827 of each of the one or more fins 805 heats the liquid in the wick structure 850, thereby turning the liquid on the fuel side of the wick structure 850 into vapor. The vapor is released into the hollow chamber 848 and distributes the heat from the interior portion 827 to the exterior portion 823 of the one or more fins 805 (as indicated by the arrows 854). In this way, the heat is transferred to the one or more fins 805 at the exterior portion 823. The cooling air is then operably directed by, and contacts, the exterior portion 823 and absorbs the heat from the one or more fins 805, thereby rejecting the heat from the one or more fins 805 (as indicated by the arrows 868) and cooling the fuel in the fuel tank 804. As the vapor cools in the hollow chamber 848, the vapor turns back into liquid and the liquid is absorbed by the wick structure 850 and is operably directed back to the fuel side of the wick structure 850 (as indicated by the arrows 852). Accordingly, the vapor chamber 840 helps to transfer or to distribute the heat from the interior portion 827 to the exterior portion 823 of the one or more fins 805.

Figure 9:
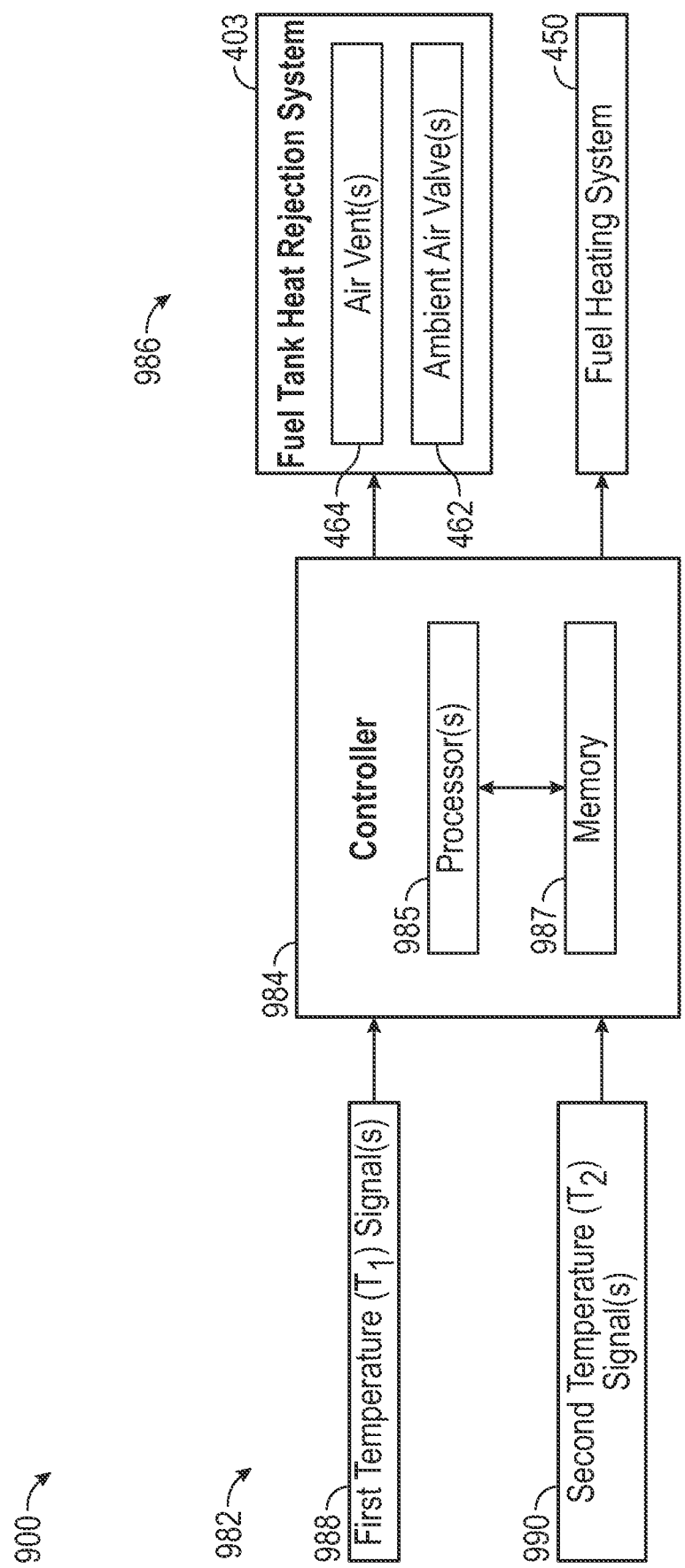
FIG. 9 is a schematic view of a fuel tank heat rejection control system for operation and control of at least portions of the aircraft of FIGS. 1A and 1B, according to the present disclosure.

FIG. 9 is a schematic view of a fuel tank heat rejection control system 900 for operation and control of at least portions of the aircraft 10 (FIGS. 1A and 1B), according to the present disclosure. The fuel tank heat rejection control system 900 includes inputs 982, the controller 984, and outputs 986. The inputs 982 include one or more first temperature ($T_1$) signals 988 from one or more first temperature sensors, and one or more second temperature ($T_2$) signals 990 from one or more second temperature sensors. The one or more first temperature sensors can be any of the first temperature sensors detailed herein. For example, the one or more first temperature sensors are located in a fuel tank of the aircraft for measuring a temperature of the fuel in the fuel tank. The one or more $T_1$ signals 988 include electrical signals indicative of a temperature of the fuel in the fuel tank. The one or more second temperature sensors can be any of the second temperature sensors detailed herein. For example, the one or more second temperature sensors are located in a fuel delivery line upstream of a combustion section of an engine of the aircraft. The one or more $T_2$ signals 990 include electrical signals indicative of a temperature of the fuel in the fuel delivery line just prior to the fuel being delivered to the combustion section of the engine.

The outputs 986 include control of the fuel tank heat rejection system 403 (FIG. 4) and control of the fuel heating system 450 (FIG. 4). While reference is made to the fuel tank heat rejection system 403 and the fuel heating system 450, the fuel tank heat rejection control system 900 can include any of the fuel tank heat rejection systems or fuel heating systems detailed herein. Control of the fuel tank heat rejection system 403 includes control of the one or more air vents 464 (FIG. 4) and the one or more air valves 462 (FIG. 4). The controller 984 receives the inputs 982, implements a method of rejecting heat from fuel in a fuel tank, and controls the outputs 986, as described with reference to FIG. 8 below.

The controller 984 may be a standalone controller or may be part of an aircraft controller or an engine controller to operate various systems of the aircraft and/or the engines. In this embodiment, the controller 984 is a computing device having one or more processors 985 and a memory 987. The one or more processors 985 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 987 can include one or more computer-readable media, including, but not limited to, non-transitory computer-readable media, a computer readable non-volatile medium (e.g., a flash memory), random access memory (RAM), read-only memory (ROM), hard drives, flash drives, or other memory devices.

The memory 987 can store information accessible by the one or more processors 985, including computer-readable instructions that can be executed by the one or more processors 985. The instructions can be any set of instructions or a sequence of instructions that, when executed by the one or more processors 985, cause the one or more processors 985 and the controller 984 to perform operations. The controller 984 and, more specifically, the one or more processors 985 are programmed or configured to perform these operations, such as the operations discussed further below. In some embodiments, the instructions can be executed by the one or more processors 985 to cause the one or more processors 985 to complete any of the operations and functions for which the controller 984 is configured, as will be described further below. The instructions can be software written in any suitable programming language or can be implemented in hardware. Additionally, or alternatively, the instructions can be executed in logically or virtually separate threads on the processors 985. The memory 987 can further store data that can be accessed by the one or more processors 985.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 984 is communicatively coupled to the one or more first temperature sensors and to the one or more second temperature sensors. The controller 984 receives the inputs 982, determines the first temperature $T_1$ and/or determines the second temperature $T_2$, and controls the outputs 986, as detailed further below.

Figure 10:
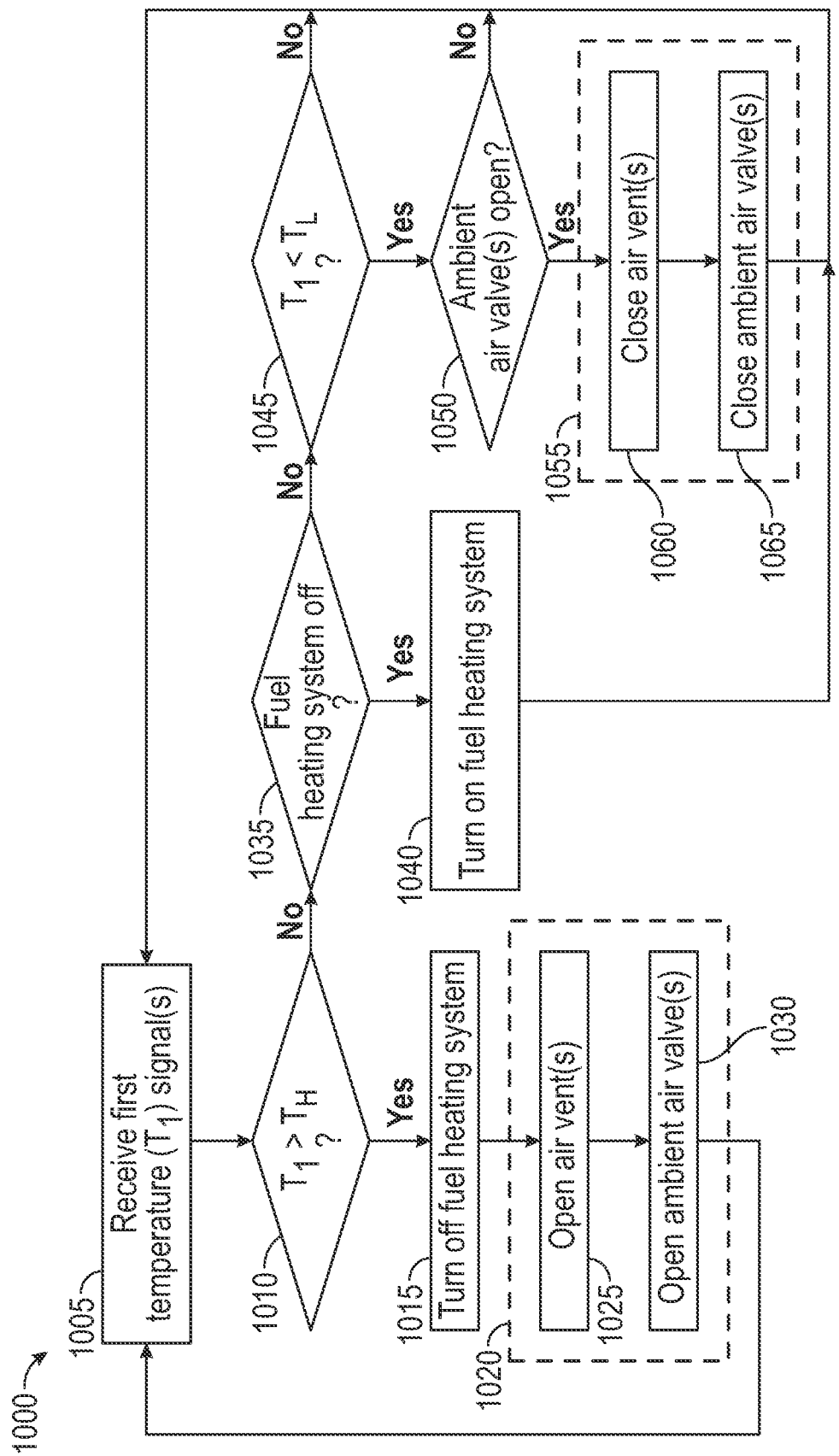
FIG. 10 is a flow diagram of a method of rejecting heat from a fuel tank of an aircraft, according to the present disclosure.

FIG. 10 is a flow diagram of a method 1000 of rejecting heat from fuel in a fuel tank of an aircraft, according to the present disclosure. For the method 1000, reference is made to FIGS. 1A, 1B, 4, and 9. The fuel tank, however, can be any of the fuel tanks detailed herein. The method 1000 proceeds after the aircraft and the engines are powered on. In some embodiments, the method 1000 proceeds after the fuel heating system 450 is powered on to heat the fuel in the fuel tank 404. For example, the controller 984 can turn the fuel heating system 450 on during takeoff and/or during climb of the aircraft. During takeoff and climb, the components of the aircraft or of the engines require maximum cooling as the temperature of such components increases during takeoff and during climb. Accordingly, the method 1000 can proceed during or after takeoff or climb. The method 1000, however, can proceed at any period during operation of the aircraft or the engines, as desired.

In step 1005, the controller 984 receives the one or more first temperature ($T_1$) signals 988 from the one or more first temperature sensors (e.g., the temperature sensor 416). The controller 984 determines the first temperature $T_1$ based on the $T_1$ signals 988. While the method 1000 utilizes the first temperature $T_1$, the method 1000 can alternatively, or additionally, utilize the second temperature $T_2$.

In step 1010, the controller 984 determines whether the first temperature $T_1$ is greater than a high temperature threshold $T_H$. The high temperature threshold $T_H$ corresponds to a temperature of the fuel just before the fuel cooks and coke is produced in the fuel. In some embodiments, the high temperature threshold $T_H$ is three hundred degrees Fahrenheit (300° F.). The high temperature threshold $T_H$, however, can be any temperature, as desired. The one or more fins 405 absorb the heat from the heated fuel in the fuel tank 404, as detailed above.

In step 1015, if the first temperature $T_1$ is greater than the high temperature threshold $T_H$ (Step 1010: Yes), then the controller 984 turns off the fuel heating system 450. In this way, the fuel in the fuel tank 404 is no longer heated.

In step 1020, the controller 984 controls the fuel tank heat rejection system 403 to open the fuel tank heat rejection system 403 and to reject the heat from the fuel tank 404. In step 1025, controlling the fuel tank heat rejection system 403 includes the controller 984 opening the one or more air vents 464. In step 1030, controlling the fuel tank heat rejection system 403 includes the controller 984 opening the one or more air valves 462. In this way, the ambient air 466 flows into the fuel tank compartment 460, passes and contacts the one or more fins 405, and flows out of the one or more air vents 464. The method 1000 then proceeds to step 1005 again. Accordingly, the fuel tank 404 rejects the heat from the fuel at a greater rate as compared to fuel tanks without the benefit of the present disclosure. Further, rejecting the heat in such a way when the first temperature $T_1$ of the fuel exceeds the high temperature threshold $T_H$ ensures that the fuel does not cook and prevents coke from forming in the fuel. Further, the fuel tank heat rejection system 403 helps to cool the fuel tank 404 at a greater rate as compared to fuel tanks without the benefit of the present disclosure.

In step 1035, if the first temperature $T_1$ is less than the high temperature threshold $T_H$ (Step 1010: No), than the controller 984 determines whether the fuel heating system 450 is off. In this way, the controller 984 determines if the fuel is currently being heated. In step 1040, if the fuel heating system 450 is off (Step 1035: Yes), the controller 984 turns on the fuel heating system 450 to heat the fuel in the fuel tank 404. The method 1000 then proceeds to step 1005 again.

In step 1045, if the fuel heating system 450 is on (Step 1035: No), the controller 984 determines whether the first temperature $T_1$ of the fuel is less than a low temperature threshold $T_L$. The low temperature threshold $T_L$ corresponds to a temperature just before the fuel becomes excessively viscous such that performance of the combustion section is reduced. In some embodiments, the low temperature threshold $T_L$ is forty degrees Fahrenheit (40° F.). The low temperature threshold $T_L$, however, can be any temperature, as desired. If the first temperature $T_1$ is greater than the low temperature threshold $T_L$ (Step 1045: No), the method 1000 proceeds to step 1005 again.

In step 1050, if the first temperature $T_1$ is less than the low temperature threshold $T_L$ (Step 1045: Yes), the controller 984 determines whether the one or more air valves 462 are open. If the one or more air valves 462 are closed (Step 1050: Yes), the method 1000 proceeds to step 1005 again. In step 1055, if the one or more air valves 462 are open (Step 1050: Yes), the controller 984 controls the fuel tank heat rejection system 403 to close the fuel tank heat rejection system 403. In step 1060, controlling the fuel tank heat rejection system 403 includes the controller 984 closing the one or more air vents 464. In step 1065, controlling the fuel tank heat rejection system 403 includes the controller 984 closing the one or more air valves 462. In this way, the ambient air 466 is prevented from flowing into the fuel tank compartment 460. The method 1000 then proceeds to step 1005 again. Accordingly, the fuel stores heat again and the heat is rejected from the fuel tank 404 at a lower rate as compared to when the fuel tank heat rejection system 403 is open.

Thus, the method 1000 ensures that the temperature of the fuel stays within a predetermined range during operation of the aircraft and of the engines. The predetermined range of the temperature of the fuel allows the fuel to absorb heat and then to reject the heat, while ensuring that the temperature of the fuel does not excessively increase such that the fuel cooks and coke is formed in the fuel. Therefore, the fuel tank heat rejection system 403 and the method 1000 allow the fuel tank 404 to reject heat from the fuel tank 404 at a greater rate than fuel tanks without the benefit of the present disclosure, while also ensuring that the fuel is kept in a temperature range that does not reduce the propulsive efficiency of the engines of the aircraft.

Further aspects are provided by the subject matter of the following clauses.

A fuel tank heat rejection system for an aircraft comprises a fuel tank compartment in the aircraft, a fuel tank having an exterior surface, the fuel tank storing fuel therein and being located in the fuel tank compartment, and one or more air valves that provide fluid communication to the fuel tank compartment, the one or more air valves opening to operably direct cooling air into the fuel tank compartment through the one or more air valves, the cooling air contacting the exterior surface of the fuel tank such that heat from the fuel is rejected from the fuel tank.

The fuel tank heat rejection system of the preceding clause, the cooling air being ambient air from atmosphere.

The fuel tank heat rejection system of any preceding clause, the fuel tank compartment further comprising one or more air vents that open to operably direct the cooling air to exit the fuel tank compartment through the one or more air vents.

The fuel tank heat rejection system of any preceding clause, further comprising a fuel heating system that heats the fuel that is stored in the fuel tank.

The fuel tank heat rejection system of any preceding clause, the aircraft comprising one or more engines, the one or more engines including a combustion section, and the fuel tank including a fuel delivery line coupled to the combustion section to deliver the fuel to the combustion section.

The fuel tank heat rejection system of any preceding clause, the fuel tank further including one or more fins that absorb the heat from the fuel tank and reject the heat from the fuel tank.

The fuel tank heat rejection system of any preceding clause, the one or more fins including an exterior portion that extends laterally from the fuel tank, and the cooling air is operably directed to contact the exterior portion of the one or more fins to reject the heat from the fuel tank.

The fuel tank heat rejection system of any preceding clause, the fuel tank defining a hollow interior, and the one or more fins include an interior portion that extends into the hollow interior of the fuel tank, the interior portion of the one or more fins absorbing heat from the fuel in the fuel tank.

The fuel tank heat rejection system of any preceding clause, the one or more fins including at least one of a heat pipe or a vapor chamber located in the one or more fins, the heat pipe or the vapor chamber distributing the heat from the interior portion of the one or more fins to the exterior portion of the one or more fins.

The fuel tank heat rejection system of any preceding clause, the one or more fins including the vapor chamber, the one or more fins defining a shape of the vapor chamber.

The fuel tank heat rejection system of any preceding clause, the one or more fins including a first set of fins on a first side of the fuel tank and a second set of fins on a second side of the fuel tank.

The fuel tank heat rejection system of any preceding clause, the interior portion of the one or more fins including a height that is less than a height of the exterior portion of the one or more fins.

The fuel tank heat rejection system of any preceding clause, the one or more fins being spaced longitudinally along the fuel tank and a gap being defined between each of the one or more fins, the fuel in the fuel tank filling the gap to contact the interior portion of the one or more fins.

The fuel tank heat rejection system of any preceding clause, the fuel tank including one or more longitudinal sides, the one or more fins extending from the one or more longitudinal sides.

The fuel tank heat rejection system of any preceding clause, the exterior portion of the one or more fins including one or more walls that extend generally perpendicularly to the one or more longitudinal sides of the fuel tank.

The fuel tank heat rejection system of any preceding clause, the one or more air vents including one or more louvers that open to open the one or more air vents.

The fuel tank heat rejection system of any preceding clause, the one or more air valves closing to prevent the cooling air from entering the fuel tank compartment.

The fuel tank heat rejection system of any preceding clause, the interior portion of the one or more fins extending from an interior surface of a first longitudinal wall of the fuel tank to the interior surface of a second longitudinal wall of the fuel tank.

The fuel tank heat rejection system of any preceding clause, the interior portion of the one or more fins defining a ramp portion that decreases in height from the exterior portion to the interior portion of the one or more fins.

The fuel tank heat rejection system of any preceding clause, the interior portion of the one or more fins defining a rib.

The fuel tank heat rejection system of any preceding clause, the ramp portion extending from the interior surface of the first longitudinal wall of the fuel tank to the rib.

The fuel tank heat rejection system of any preceding clause, the rib extending from the ramp portion to the interior surface of the second longitudinal wall of the fuel tank.

The fuel tank heat rejection system of any preceding clause, the one or more fins being made from a material having a high thermal conductivity coefficient.

The fuel tank heat rejection system of any preceding clause, the material of the one or more fins being at least one of aluminum or beryllium.

The fuel tank heat rejection system of any preceding clause, the one or more fins including solid fins being made from a solid material.

The fuel tank heat rejection system of any preceding clause, the at least one of the heat pipe or the vapor chamber including a wick structure that stores a liquid that turns to vapor when the fuel is heated.

The fuel tank heat rejection system of any preceding clause, the vapor being operably directed into a hollow chamber of the at least one of the heat pipe or the vapor chamber and distributing the heat from the interior portion of the one or more fins to the exterior portion of the one or more fins within the at least one of the heat pipe or the vapor chamber.

The fuel tank heat rejection system of any preceding clause, the heat pipe including a generally cylindrical shape.

The fuel tank heat rejection system of any preceding clause, the fuel tank being located in a fuselage of the aircraft.

The fuel tank heat rejection system of any preceding clause, the fuel tank being located in a wing of the aircraft.

The fuel tank heat rejection system of any preceding clause, the fuel tank being a first fuel tank, the fuel tank heat rejection system further comprising a second fuel tank that stores fuel therein, the second fuel tank circulating the fuel into the first fuel tank.

The fuel tank heat rejection system of any preceding clause, the first fuel tank being located in a fuselage of the aircraft and the second fuel tank being located in the wing of the aircraft.

The fuel tank heat rejection system of any preceding clause, further comprising a fuel pump that pumps the fuel from the second fuel tank to the first fuel tank.

The fuel tank heat rejection system of any preceding clause, the aircraft further comprising a fuel delivery system including the fuel tank, a fuel pump, and the fuel delivery line, the fuel pump pumping the fuel from the fuel tank to the combustion section through the fuel delivery line.

The fuel tank heat rejection system of any preceding clause, the fuel delivery line further including a metering valve and a flowmeter that control the flow rate of the fuel in the fuel delivery line to the combustion section.

The fuel tank heat rejection system of any preceding clause, further comprising one or more temperature sensors for measuring a temperature of the fuel.

The fuel tank heat rejection system of any preceding clause, the one or more temperature sensors including a first temperature sensor for measuring a first temperature of the fuel in the fuel tank.

The fuel tank heat rejection system of any preceding clause, the one or more temperature sensors including a second temperature sensor for measuring a second temperature of the fuel in the fuel delivery line.

The fuel tank heat rejection system of any preceding clause, the fuel heating system turning off when the temperature of the fuel increases above a high temperature threshold.

The fuel tank heat rejection system of any preceding clause, the one or more air valves opening when the temperature of the fuel increases above the high temperature threshold.

The fuel tank heat rejection system of any preceding clause, the one or more air vents opening when the temperature of the fuel increases above the high temperature threshold.

The fuel tank heat rejection system of any preceding clause, the one or more air valves closing when the temperature of the fuel decreases below a low temperature threshold.

The fuel tank heat rejection system of any preceding clause, the one or more air vents closing when the temperature of the fuel decreases below the low temperature threshold.

The fuel tank heat rejection system of any preceding clause, the aircraft further including a thermal management system that cools one or more thermal loads of at least one of the engine or the aircraft.

The fuel tank heat rejection system of any preceding clause, the thermal management system including one or more cooling systems, the one or more cooling systems being in fluid communication with the fuel tank, the fuel in the fuel tank cooling the one or more thermal loads by absorbing heat from the thermal loads in the one or more cooling systems.

The fuel tank heat rejection system of any preceding clause, the fuel delivery line being in fluid communication with one or more heat exchangers of the one or more cooling systems, the fuel flowing through the one or more heat exchangers to cool the one or more thermal loads.

The fuel tank heat rejection system of any preceding clause, the one or more heat exchangers including one or more fuel-cooled oil coolers.

The fuel tank heat rejection system of any preceding clause, further comprising a controller that controls the air valve to open and to close the air valve.

The fuel tank heat rejection system of any preceding clause, the controller controlling the air vent to open and to close the air vent.

An aircraft comprises a fuel tank compartment in the aircraft, a fuel tank having an exterior surface, the fuel tank storing fuel therein and being located in the fuel tank compartment, and fuel tank heat rejection system comprising one or more air valves that provide fluid communication to the fuel tank compartment, the one or more air valves opening to operably direct cooling air into the fuel tank compartment through the one or more air valves, the cooling air contacting the exterior surface of the fuel tank such that heat from the fuel is rejected from the fuel tank.

The aircraft of the preceding clause, the cooling air being ambient air from atmosphere.

The aircraft of any preceding clause, the fuel tank compartment further comprising one or more air vents that open to operably direct the cooling air to exit the fuel tank compartment through the one or more air vents.

The aircraft of any preceding clause, further comprising a fuel heating system that heats the fuel that is stored in the fuel tank.

The aircraft of any preceding clause, the aircraft comprising one or more engines, the one or more engines including a combustion section, and the fuel tank including a fuel delivery line coupled to the combustion section to deliver the fuel to the combustion section.

The aircraft of any preceding clause, the fuel tank further including one or more fins that absorb the heat from the fuel tank and reject the heat from the fuel tank.

The aircraft of any preceding clause, the one or more fins including an exterior portion that extends laterally from the fuel tank, and the cooling air is operably directed to contact the exterior portion of the one or more fins to reject the heat from the fuel tank.

The aircraft of any preceding clause, the fuel tank defining a hollow interior, and the one or more fins include an interior portion that extends into the hollow interior of the fuel tank, the interior portion of the one or more fins absorbing heat from the fuel in the fuel tank.

The aircraft of any preceding clause, the one or more fins including at least one of a heat pipe or a vapor chamber located in the one or more fins, the at least one of the heat pipe or the vapor chamber distributing the heat from the interior portion of the one or more fins to the exterior portion of the one or more fins.

The aircraft of any preceding clause, the one or more fins including the vapor chamber, the one or more fins defining a shape of the vapor chamber.

The aircraft of any preceding clause, the one or more fins including a first set of fins on a first side of the fuel tank and a second set of fins on a second side of the fuel tank.

The aircraft of any preceding clause, the interior portion of the one or more fins including a height that is less than a height of the exterior portion of the one or more fins.

The aircraft of any preceding clause, the one or more fins being spaced longitudinally along the fuel tank and a gap being defined between each of the one or more fins, the fuel in the fuel tank filling the gap to contact the interior portion of the one or more fins.

The aircraft of any preceding clause, the fuel tank including one or more longitudinal sides, the one or more fins extending from the one or more longitudinal sides.

The aircraft of any preceding clause, the exterior portion of the one or more fins including one or more walls that extend generally perpendicularly to the one or more longitudinal sides of the fuel tank.

The aircraft of any preceding clause, the one or more air vents including one or more louvers that open to open the one or more air vents.

The aircraft of any preceding clause, the one or more air valves closing to prevent the cooling air from entering the fuel tank compartment.

The aircraft of any preceding clause, the interior portion of the one or more fins extending from an interior surface of a first longitudinal wall of the fuel tank to the interior surface of a second longitudinal wall of the fuel tank.

The aircraft of any preceding clause, the interior portion of the one or more fins defining a ramp portion that decreases in height from the exterior portion to the interior portion of the one or more fins.

The aircraft of any preceding clause, the interior portion of the one or more fins defining a rib.

The aircraft of any preceding clause, the ramp portion extending from the interior surface of the first longitudinal wall of the fuel tank to the rib.

The aircraft of any preceding clause, the rib extending from the ramp portion to the interior surface of the second longitudinal wall of the fuel tank.

The aircraft of any preceding clause, the one or more fins being made from a material having a high thermal conductivity coefficient.

The aircraft of any preceding clause, the material of the one or more fins being at least one of aluminum or beryllium.

The aircraft of any preceding clause, the one or more fins including solid fins being made from a solid material.

The aircraft of any preceding clause, the at least one of the heat pipe or the vapor chamber including a wick structure that stores a liquid that turns to vapor when the fuel is heated.

The aircraft of any preceding clause, the vapor being operably directed into a hollow chamber of the at least one of the heat pipe or the vapor chamber and distributing the heat from the interior portion of the one or more fins to the exterior portion of the one or more fins within the at least one of the heat pipe or the vapor chamber.

The aircraft of any preceding clause, the heat pipe including a generally cylindrical shape.

The aircraft of any preceding clause, further comprising a fuselage, the fuel tank being located in the fuselage.

The aircraft of any preceding clause, further comprising one or more wings, the fuel tank being located in the one or more wings.

The aircraft of any preceding clause, the fuel tank being a first fuel tank, the fuel tank heat rejection system further comprising a second fuel tank that stores fuel therein, the second fuel tank circulating the fuel into the first fuel tank.

The aircraft of any preceding clause, the first fuel tank being located in the fuselage and the second fuel tank being located in the one or more wings.

The aircraft of any preceding clause, further comprising a fuel pump that pumps the fuel from the second fuel tank to the first fuel tank.

The aircraft of any preceding clause, further comprising a fuel delivery system including the fuel tank, a fuel pump, and the fuel delivery line, the fuel pump pumping the fuel from the fuel tank to the combustion section through the fuel delivery line.

The aircraft of any preceding clause, the fuel delivery line further including a metering valve and a flowmeter that control the flow rate of the fuel in the fuel delivery line to the combustion section.

The aircraft of any preceding clause, further comprising one or more temperature sensors for measuring a temperature of the fuel.

The aircraft of any preceding clause, the one or more temperature sensors including a first temperature sensor for measuring a first temperature of the fuel in the fuel tank.

The aircraft of any preceding clause, the one or more temperature sensors including a second temperature sensor for measuring a second temperature of the fuel in the fuel delivery line.

The aircraft of any preceding clause, the fuel heating system turning off when the temperature of the fuel increases above a high temperature threshold.

The aircraft of any preceding clause, the one or more air valves opening when the temperature of the fuel increases above the high temperature threshold.

The aircraft of any preceding clause, the one or more air vents opening when the temperature of the fuel increases above the high temperature threshold.

The aircraft of any preceding clause, the one or more air valves closing when the temperature of the fuel decreases below a low temperature threshold.

The aircraft of any preceding clause, the one or more air vents closing when the temperature of the fuel decreases below the low temperature threshold.

The aircraft of any preceding clause, further comprising a thermal management system that cools one or more thermal loads of at least one of the engine or the aircraft.

The aircraft of any preceding clause, the thermal management system includes one or more cooling systems, the one or more cooling systems being in fluid communication with the fuel tank, the fuel in the fuel tank cooling the one or more thermal loads by absorbing heat from the thermal loads in the one or more cooling systems.

The aircraft of any preceding clause, the fuel delivery line being in fluid communication with one or more heat exchangers of the one or more cooling systems, the fuel flowing through the one or more heat exchangers to cool the one or more thermal loads.

The aircraft of any preceding clause, the one or more heat exchangers including one or more fuel-cooled oil coolers.

The aircraft of any preceding clause, further comprising a controller that controls the air valve to open and to close the air valve.

The aircraft of any preceding clause, the controller controlling the air vent to open and to close the air vent.

A method of rejecting heat from fuel in a fuel tank for an aircraft, the aircraft including a fuel tank compartment, the fuel tank having an exterior surface and being located in the fuel tank compartment. The method comprising opening one or more air valves to provide fluid communication to the fuel tank compartment, operably directing cooling air into the fuel tank compartment through the one or more air valves, and operably directing the cooling air to contact the exterior surface of the fuel tank such that heat from the fuel is rejected from the fuel tank.

The method of the preceding clause, the cooling air being ambient air from atmosphere.

The method of any preceding clause, further comprising opening one or more air vents and operably directing the cooling air through the one or more air vents to exit the fuel tank compartment.

The method of any preceding clause, further comprising heating the fuel in the fuel tank with a fuel heating system.

The method of any preceding clause, further comprising delivering the fuel from the fuel tank to a combustion section of one or more engines of the aircraft.

The method of any preceding clause, the fuel tank further comprising one or more fins, and the method further comprising absorbing the heat from the fuel tank with the one or more fins, and rejecting the heat from the fuel tank with the one or more fins.

The method of any preceding clause, further comprising operably directing the cooling air to contact an exterior portion of the one or more fins that extends laterally from the fuel tank to reject the heat from the fuel tank.

The method of any preceding clause, further comprising absorbing the heat from the fuel in the fuel tank with an interior portion of the one or more fins that extends into a hollow interior of the fuel tank.

The method of any preceding clause, further comprising distributing the heat from the interior portion of the one or more fins to the exterior portion of the one or more fins with at least one of a heat pipe or a vapor chamber in the one or more fins.

The method of any preceding clause, the one or more fins including the vapor chamber and defining a shape of the vapor chamber.

The method of any preceding clause, further comprising providing a first set of fins on a first side of the fuel tank and a second set of fins on a second side of the fuel tank.

The method of any preceding clause, the interior portion of the one or more fins including a height that is less than a height of the exterior portion of the one or more fins.

The method of any preceding clause, further comprising spacing the one or more fins longitudinally along the fuel tank such that a gap is defined between each of the one or more fins, and filling the gap with the fuel in the fuel tank, the fuel contacting the interior portion of the one or more fins.

The method of any preceding clause, further comprising extending the one or more fins from the one or more longitudinal sides of the fuel tank.

The method of any preceding clause, further comprising extending one or more walls of the exterior portion generally perpendicularly to the one or more longitudinal sides of the fuel tank.

The method of any preceding clause, further comprising opening one or more louvers of the one or more air vents to open the one or more air vents.

The method of any preceding clause, further comprising closing the one or more air valves to prevent the cooling air from entering the fuel tank compartment.

The method of any preceding clause, further comprising extending the interior portion of the one or more fins from an interior surface of a first longitudinal wall of the fuel tank to the interior surface of a second longitudinal wall of the fuel tank.

The method of any preceding clause, further comprising providing a ramp portion of the interior portion that decreases in height from the exterior portion to the interior portion of the one or more fins.

The method of any preceding clause, the interior portion of the one or more fins defining a rib.

The method of any preceding clause, the ramp portion extending from the interior surface of the first longitudinal wall of the fuel tank to the rib.

The method of any preceding clause, further comprising extending the rib from the ramp portion to the interior surface of the second longitudinal wall of the fuel tank.

The method of any preceding clause, the one or more fins being made from a material having a high thermal conductivity coefficient.

The method of any preceding clause, the material of the one or more fins being at least one of aluminum or beryllium.

The method of any preceding clause, further comprising storing a liquid in a wick structure of the at least one of the heat pipe or the vapor chamber that turns to vapor when the fuel is heated.

The method of any preceding clause, further comprising operably directing the vapor into a hollow chamber of the at least one of the heat pipe or the vapor chamber, and distributing, by the vapor, the heat from the interior portion of the one or more fins to the exterior portion of the one or more fins within the at least one of the heat pipe or the vapor chamber.

The method of any preceding clause, the fuel tank being located in a fuselage of the aircraft.

The method of any preceding clause, the fuel tank being located in a wing of the aircraft.

The method of any preceding clause, the fuel tank being a first fuel tank, the fuel tank heat rejection system further comprising a second fuel tank that stores fuel therein, the method further comprising circulating the fuel from the second fuel tank into the first fuel tank.

The method of any preceding clause, the first fuel tank being located in a fuselage of the aircraft and the second fuel tank being located in the wing of the aircraft.

The method of any preceding clause, further comprising pumping, by a fuel pump, the fuel from the second fuel tank to the first fuel tank.

The method of any preceding clause, the aircraft further comprising a fuel delivery system including the fuel tank, a fuel pump, and the fuel delivery line, the method further comprising pumping, by the fuel pump, the fuel from the fuel tank to the combustion section through the fuel delivery line.

The method of any preceding clause, further comprising controlling, by a metering valve and flowmeter, the flow rate of the fuel in the fuel delivery line to the combustion section.

The method of any preceding clause, further comprising cooling, with a thermal management system, one or more thermal loads of at least one of the engine or the aircraft.

The method of any preceding clause, the thermal management system including one or more cooling systems, the one or more cooling systems being in fluid communication with the fuel tank, the method further comprising cooling, with the fuel in the fuel tank, the one or more thermal loads by absorbing heat from the thermal loads in the one or more cooling systems.

The method of any preceding clause, the fuel delivery line being in fluid communication with one or more heat exchangers of the one or more cooling systems, the method further comprising flowing the fuel through the one or more heat exchangers to cool the one or more thermal loads.

The method of any preceding clause, the one or more heat exchangers including one or more fuel-cooled oil coolers.

A method of rejecting heat from fuel in a fuel tank for an aircraft. The method comprising heating fuel in the fuel tank with a fuel heating system, determining whether a temperature of the fuel is greater than a high temperature threshold, and, when the temperature of the fuel is greater than the high temperature threshold, turning off the fuel heating system.

The method of the preceding clause, further comprising opening a fuel tank heat rejection system to direct cooling air by the fuel tank to reject the heat from the fuel in the fuel tank when the temperature of the fuel is greater than the high temperature threshold.

The method of any preceding clause, opening the fuel tank heat rejection system including opening one or more air valves to direct the cooling air into the fuel tank compartment and by the fuel tank.

The method of any preceding clause, opening the fuel tank heat rejection system further including opening one or more air vents to direct the cooling air out of the aircraft.

The method of the preceding clause, the cooling air being ambient air from atmosphere.

The method of any preceding clause, further comprising, when the temperature of the fuel is less than the high temperature threshold, determining whether the fuel heating system is off, and, when the fuel heating system is off turning on the fuel heating system.

The method of any preceding clause, further comprising determining whether the temperature of the fuel is below a low temperature threshold, and, when the temperature of the fuel is below the low temperature threshold, closing the fuel tank heat rejection system to prevent the cooling air from being directed by the fuel tank.

The method of any preceding clause, closing the fuel tank heat rejection system including closing the one or more air valves to prevent the cooling air from entering the fuel tank compartment.

The method of any preceding clause, closing the fuel tank heat rejection system including closing the one or more air vents to prevent the cooling air from exiting the aircraft.

The method of any preceding clause, the temperature of the fuel being a first temperature of the fuel in the fuel tank.

The method of any preceding clause, the temperature of the fuel being a second temperature of the fuel in a fuel delivery line that delivers the fuel from the fuel tank to a combustion section of an engine of the aircraft.

The method of any preceding clause, the high temperature threshold being 300° F.

The method of any preceding clause, the low temperature threshold being 40° F.

The method of any preceding clause, the fuel tank being a first fuel tank, and the aircraft further including a second fuel tank, the method further comprising circulating the heated fuel from the first fuel tank to the second fuel tank.

The method of any preceding clause, the fuel tank heat rejection system comprising the fuel tank heat rejection system of any preceding clause.

A fuel tank heat rejection control system comprising a fuel tank for an aircraft, a fuel heating system, and a controller. The fuel tank storing fuel therein. The controller controlling the fuel heating system to heat the fuel in the fuel tank, determining whether a temperature of the fuel is greater than a high temperature threshold, and, when the temperature of the fuel is greater than the high temperature threshold, turning off the heating system.

The fuel tank heat rejection control system of the preceding clause, further comprising a fuel tank heat rejection system, the controller controlling the fuel tank heat rejection system to open the fuel tank heat rejection system to direct cooling air by the fuel tank to reject the heat from the fuel in the fuel tank when the temperature of the fuel is greater than the high temperature threshold.

The fuel tank heat rejection control system of any preceding clause, opening the fuel tank heat rejection system includes the controller controlling one or more air valves to open one or more air valves to direct the cooling air into the fuel tank compartment and by the fuel tank.

The fuel tank heat rejection control system of any preceding clause, opening the fuel tank heat rejection system further includes the controller controlling one or more air vents to open the one or more air vents to direct the cooling air out of the aircraft.

The fuel tank heat rejection control system of the preceding clause, the cooling air being ambient air from atmosphere.

The fuel tank heat rejection control system of any preceding clause, when the temperature of the fuel is less than the high temperature threshold, the controller determining whether the fuel heating system is off, and, when the fuel heating system is off the controller turning on the fuel heating system.

The fuel tank heat rejection control system of any preceding clause, further comprising the controller determining whether the temperature of the fuel is below a low temperature threshold, and, when the temperature of the fuel is below the low temperature threshold, the controller closing the fuel tank heat rejection system to prevent the cooling air from being directed by the fuel tank.

The fuel tank heat rejection control system of any preceding clause, closing the fuel tank heat rejection system including the controller closing the one or more air valves to prevent the cooling air from entering the fuel tank compartment.

The fuel tank heat rejection control system of any preceding clause, closing the fuel tank heat rejection system including the controller closing the one or more air vents to prevent the cooling air from exiting the aircraft.

The fuel tank heat rejection control system of any preceding clause, the temperature of the fuel being a first temperature of the fuel in the fuel tank.

The fuel tank heat rejection control system of any preceding clause, the temperature of the fuel being a second temperature of the fuel in a fuel delivery line that delivers the fuel from the fuel tank to a combustion section of an engine of the aircraft.

The fuel tank heat rejection control system of any preceding clause, the high temperature threshold being 300° F.

The fuel tank heat rejection control system of any preceding clause, the low temperature threshold being 40° F.

The fuel tank heat rejection control system of any preceding clause, the fuel tank being a first fuel tank, and the aircraft further including a second fuel tank, the controller controlling a fuel delivery system to circulate the heated fuel from the first fuel tank to the second fuel tank.

The fuel tank heat rejection control system of any preceding clause, the fuel tank heat rejection system comprising the fuel tank heat rejection system of any preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A fuel tank heat rejection system for an aircraft, the fuel tank heat rejection system comprising:
   a fuel tank compartment;
   a fuel tank having an exterior surface, the fuel tank storing fuel therein and being located in the fuel tank compartment; and
   one or more air valves that provide fluid communication to the fuel tank compartment, the one or more air valves configured to open to operably direct cooling air into the fuel tank compartment through the one or more air valves, the cooling air contacting the exterior surface of the fuel tank such that heat from the fuel is rejected from the fuel tank,
   wherein the fuel tank further includes one or more fins that absorb the heat from the fuel tank and reject the heat from the fuel tank,
   wherein the one or more fins include an exterior portion that extends laterally from the fuel tank, and the cooling air is operably directed to contact the exterior portion of the one or more fins to reject the heat from the fuel tank,
   wherein the fuel tank defines a hollow interior, and the one or more fins include an interior portion that extends into the hollow interior of the fuel tank, the interior portion of the one or more fins absorbing heat from the fuel in the fuel tank.

2. The fuel tank heat rejection system of claim 1, wherein the cooling air is ambient air from atmosphere.

3. The fuel tank heat rejection system of claim 1, wherein the fuel tank compartment further comprises one or more air vents that open to operably direct the cooling air to exit the fuel tank compartment through the one or more air vents.

4. The fuel tank heat rejection system of claim 1, further comprising a fuel heating system that heats the fuel that is stored in the fuel tank.

5. The fuel tank heat rejection system of claim 1, wherein the aircraft comprises one or more engines, the one or more engines including a combustion section, and the fuel tank including a fuel delivery line coupled to the combustion section to deliver the fuel to the combustion section.

6. The fuel tank heat rejection system of claim 1, wherein the one or more fins include at least one of a heat pipe or a vapor chamber located in the one or more fins, the at least one of the heat pipe or the vapor chamber distributing the heat from the interior portion of the one or more fins to the exterior portion of the one or more fins.

7. The fuel tank heat rejection system of claim 6, wherein the one or more fins include the vapor chamber, the one or more fins defining a shape of the vapor chamber.

8. An aircraft comprising:
a fuel tank compartment in the aircraft;
a fuel tank having an exterior surface, the fuel tank storing fuel therein and being located in the fuel tank compartment; and
a fuel tank heat rejection system comprising:
one or more air valves that provide fluid communication to the fuel tank compartment, the one or more air valves configured to open to operably direct cooling air into the fuel tank compartment through the one or more air valves, the cooling air contacting the exterior surface of the fuel tank such that heat from the fuel is rejected from the fuel tank,
wherein the fuel tank further includes one or more fins that absorb the heat from the fuel tank and reject the heat from the fuel tank,
wherein the one or more fins include an exterior portion that extends laterally from the fuel tank, and the cooling air is operably directed to contact the exterior portion of the one or more fins to reject the heat from the fuel tank,
wherein the fuel tank defines a hollow interior, and the one or more fins include an interior portion that extends into the hollow interior of the fuel tank, the interior portion of the one or more fins absorbing heat from the fuel in the fuel tank.

9. The aircraft of claim 8, wherein the cooling air is ambient air from atmosphere.

10. The aircraft of claim 8, wherein the fuel tank compartment further comprises one or more air vents that open to operably direct the cooling air to exit the fuel tank compartment through the one or more air vents.

11. The aircraft of claim 8, further comprising a fuel heating system that heats the fuel that is stored in the fuel tank.

12. The aircraft of claim 8, wherein the aircraft comprises one or more engines, the one or more engines including a combustion section, and the fuel tank including a fuel delivery line coupled to the combustion section to deliver the fuel to the combustion section.

13. The aircraft of claim 8, wherein the one or more fins include at least one of a heat pipe or a vapor chamber located in the one or more fins, the at least one of the heat pipe or the vapor chamber distributing the heat from the interior portion of the one or more fins to the exterior portion of the one or more fins.

14. The aircraft of claim 13, wherein the one or more fins include the vapor chamber, the one or more fins defining a shape of the vapor chamber.

* * * * *